US011029225B1

(12) United States Patent
Tachibana et al.

(10) Patent No.: US 11,029,225 B1
(45) Date of Patent: Jun. 8, 2021

(54) ELECTRONIC DEVICE, CRANK ASSEMBLY WITH ELECTRONIC DEVICE AND DRIVE TRAIN INCLUDING CRANK ASSEMBLY WITH ELECTRONIC DEVICE

(71) Applicant: Shimano Inc., Osaka (JP)

(72) Inventors: Hiroshi Tachibana, Osaka (JP); Fumiaki Yoshida, Osaka (JP)

(73) Assignee: Shimano Inc., Osaka (JP)

( * ) Notice: Subject to any disclaimer, the term of this patent is extended or adjusted under 35 U.S.C. 154(b) by 61 days.

(21) Appl. No.: 16/728,231

(22) Filed: Dec. 27, 2019

(51) Int. Cl.
| | |
|---|---|
| *G01L 3/00* | (2006.01) |
| *G01L 3/10* | (2006.01) |
| *F16H 61/02* | (2006.01) |
| *B62K 23/00* | (2006.01) |
| *B62M 3/16* | (2006.01) |
| *B62M 9/00* | (2006.01) |
| *B62J 45/40* | (2020.01) |

(52) U.S. Cl.
CPC .............. *G01L 3/108* (2013.01); *B62K 23/00* (2013.01); *B62M 3/16* (2013.01); *F16H 61/0202* (2013.01); *B62J 45/40* (2020.02); *B62M 2009/005* (2013.01)

(58) Field of Classification Search
CPC .......... G01L 3/108; B62K 23/00; B62M 3/16; B62M 2009/005; F16H 61/0202; B62J 45/40
See application file for complete search history.

(56) References Cited

U.S. PATENT DOCUMENTS

| | | | |
|---|---|---|---|
| 4,141,248 A | 2/1979 | Bargenda | |
| 4,463,433 A | 7/1984 | Hull et al. | |
| 4,938,475 A * | 7/1990 | Sargeant | A63B 21/0053 482/9 |
| 8,006,574 B2 | 8/2011 | Meyer | |
| 8,065,926 B2 | 11/2011 | Meyer | |
| 8,505,393 B2 | 8/2013 | Meyer | |
| 9,010,201 B2 | 4/2015 | Kodama et al. | |
| 10,076,681 B2 | 9/2018 | Lull et al. | |

(Continued)

FOREIGN PATENT DOCUMENTS

| | | |
|---|---|---|
| DE | 4227586 A1 | 2/1994 |
| EP | 2477881 A1 | 7/2012 |

(Continued)

*Primary Examiner* — Max H Noori
(74) *Attorney, Agent, or Firm* — Global IP Counselors, LLP

(57) ABSTRACT

An electronic device includes a receiver, a computer memory device and a processor for calculating a human input force and/or a human input power that are inputted to a drive train of a human powered vehicle. The receiver receives first information with respect to torque applied to the drive train, and receives at least one of second information with respect to a gear engagement state and third information with respect to a crank rotational speed. The computer memory device has prestored correction factors with respect to the gear engagement state. The processor calculates the human input force based on the first information, the second information and at least one of the prestored correction factors, and/or calculates the human input power based on the first information, the second information, the third information, and at least one of the prestored correction factors.

19 Claims, 10 Drawing Sheets

(56) References Cited

U.S. PATENT DOCUMENTS

| | | |
|---|---|---|
| 2003/0163287 A1 | 8/2003 | Vock et al. |
| 2006/0143645 A1 | 6/2006 | Vock et al. |
| 2008/0103030 A1* | 5/2008 | Watson ............... A63B 22/0605 482/61 |
| 2008/0236293 A1 | 10/2008 | Meggiolan |
| 2010/0263468 A1 | 10/2010 | Fisher et al. |
| 2012/0166105 A1* | 6/2012 | Biermann ............... G01L 3/108 702/43 |
| 2012/0214646 A1 | 8/2012 | Lull et al. |
| 2012/0238410 A1* | 9/2012 | Magakat ................. B62M 3/00 482/57 |
| 2012/0330572 A1 | 12/2012 | Longman |
| 2013/0019700 A1 | 1/2013 | Matsumoto |
| 2013/0104650 A1 | 5/2013 | Bailey et al. |
| 2013/0205916 A1 | 8/2013 | Kodama et al. |
| 2013/0210583 A1 | 8/2013 | Kametani et al. |
| 2013/0233126 A1 | 9/2013 | Tetsuka |
| 2014/0283622 A1* | 9/2014 | Namiki ................... B62M 3/00 73/862.53 |
| 2015/0046100 A1 | 2/2015 | Matsumoto |
| 2017/0001682 A1* | 1/2017 | Hayslett ............... B62M 11/145 |
| 2017/0176275 A1 | 6/2017 | Tetsuka et al. |
| 2018/0148126 A1 | 5/2018 | Tetsuka et al. |
| 2019/0217918 A1 | 7/2019 | Collen et al. |
| 2019/0315433 A1* | 10/2019 | Hasumi ............... B60W 30/188 |

FOREIGN PATENT DOCUMENTS

| | | |
|---|---|---|
| EP | 2631621 A2 | 8/2013 |
| JP | 2005-315819 A | 11/2005 |
| JP | 2014-044176 A | 3/2014 |
| JP | 5483299 B2 | 5/2014 |
| JP | 5483300 B | 5/2014 |
| JP | 5490914 B | 5/2014 |
| JP | 5490915 B | 5/2014 |
| JP | 5490916 B | 5/2014 |
| JP | 5490917 B | 5/2014 |
| JP | 2014-134505 A | 7/2014 |
| JP | 2014-134506 A | 7/2014 |
| JP | 2014-134507 A | 7/2014 |
| JP | 2014-134508 A | 7/2014 |
| JP | 2014-134509 A | 7/2014 |
| JP | 2014-134510 A | 7/2014 |
| JP | 5719936 B | 5/2015 |
| WO | 2008/110836 A1 | 9/2008 |
| WO | 2009/006673 A1 | 1/2009 |
| WO | 2011/030215 A1 | 3/2011 |
| WO | 2011/063468 A1 | 6/2011 |
| WO | 2012/053114 A1 | 4/2012 |
| WO | 2012/056510 A1 | 5/2012 |
| WO | 2012/056522 A1 | 5/2012 |
| WO | 2012/056558 A1 | 5/2012 |
| WO | 2013-017465 A2 | 2/2013 |
| WO | 2015/141008 A1 | 9/2015 |
| WO | 2016/009536 A1 | 1/2016 |
| WO | 2016/009537 A1 | 1/2016 |
| WO | 2016/009538 A1 | 1/2016 |
| WO | 2016/009539 A1 | 1/2016 |
| WO | 2016/009540 A1 | 1/2016 |

\* cited by examiner

ELECTRONIC DEVICE, CRANK ASSEMBLY WITH ELECTRONIC DEVICE AND DRIVE TRAIN INCLUDING CRANK ASSEMBLY WITH ELECTRONIC DEVICE

BACKGROUND

Technical Field

This disclosure generally relates to an electronic device configured to calculate at least one of the human input force and the human input power to a vehicle drive train.

Background Information

Most bicycles have a drive train that uses a chain to transmit the pedaling action from the rider to the rear wheel. A bicycle drive train typically has one or more front sprockets provided on a bicycle crank assembly of the bicycle and one or more rear sprockets provided on a rear hub of the bicycle. The chain wraps around the front and rear sprockets. Thus, rotation of the bicycle crank assembly by the rider is transmitted to the rear wheel by the chain, which meshes with the front and rear sprockets.

Recently, some bicycles are equipped with various sensors for providing information to a rider and/or for providing information to a controller to control various aspects of the bicycle, such as shifting or suspension stiffness. For example, pedaling force detectors typically use strain gauges to measure pedaling force during pedaling. Some pedaling force detectors are arranged to have sensor circuits and disposed on a crank assembly. Sensor circuits may be configured to process pedaling force information detected by the strain gauges and transmit this information so that it is received by the rider. The strain gauges have been mounted on crank arms as disclosed in U.S. Patent Application Publication No. US 2018/0148126, or the strain gauges have been mounted on a chain ring or a chain ring carrier as disclosed in U.S. Patent Application Publication No. US 2019/0217918A1. U.S. Patent Application Publication No. US 2017/0176275A discloses strain gauges. In U.S. Pat. No. 10,076,681 B2, there are four strain gauges which makes a bridge circuit.

SUMMARY

Generally, the present disclosure is directed to various features of an electronic device. In one feature, an electronic device is provided that calculates at least one of the human input force and the human input power to a vehicle drive train.

In view of the state of the known technology and in accordance with a first aspect of the present disclosure, an electronic device is provided for calculating at least one of a human input force and a human input power that are inputted to a drive train of a human powered vehicle. The electronic device basically comprises a receiver, a computer memory device, and a processor. The receiver is configured to receive first information with respect to torque applied to the drive train, and to receive at least one of second information with respect to a gear engagement state of a plurality of sprockets with a chain and third information with respect to a crank rotational speed of the drive train. The computer memory device has a plurality of prestored correction factors with respect to the gear engagement state. The processor is configured to calculate at least one of the human input force and the human input power. The human input force is applied to the drive train based on the first information, the second information and at least one of the prestored correction factors. The human input power is based on the first information, the second information, the third information, and at least one of the prestored correction factors.

With the electronic device according to the first aspect, it is possible to more accurately calculate at least one of human input force and human input power.

In accordance with a second aspect of the present disclosure, the electronic device according to the first aspect is configured so that the computer memory device has the plurality of the prestored correction factors associated with a plurality of strain sensors coupled to the drive train to detect the first information. The processor is configured to calculate at least one of the human input force and the human input power by using individual signals detected by the plurality of strain gauges as a part of the first information. The at least one of the human input force and the human input power is corrected with the plurality of the prestored correction factors.

With the electronic device according to the second aspect, it is possible to even more accurately calculate at least one of human input force and human input power.

In accordance with a third aspect of the present disclosure, the electronic device according to the first or second aspects further comprises a display in communication with the processor. The processor is configured to output a signal related to at least one of the human input force and the human input power to the display.

With the electronic device according to the third aspect, it is possible to for a user to view information related to at least one of the human input force and the human input power. In addition, or alternatively, it is possible to for user to view how the information is being used to control one or more components.

In accordance with a fourth aspect of the present disclosure, the electronic device according to the any of the first to third aspects is configured so that the electronic device is a remote component that is separated from the drive train.

With the electronic device according to the fourth aspect, it is possible to locate the electronic device in a more convenient and/or accessible location.

In accordance with a fifth aspect of the present disclosure, the electronic device according to the fourth aspect is configured so that the electronic device is one of a cycling computer or a mobile device.

With the electronic device according to the fifth aspect, it is possible to avoid additional parts such as an additional controller and/or display by using these parts of the cycling computer or a mobile device, which is typically already present.

In accordance with a sixth aspect of the present disclosure, a crank assembly is provided that comprises the electronic device according to any of the first to fifth aspects. The crank assembly further comprises a crank assembly body, and at least one strain sensor coupled to the crank assembly body to detect the first information.

With the crank assembly according to the sixth aspect, it is possible to more accurately calculate at least one of human input force and human input power.

In accordance with a seventh aspect of the present disclosure, the crank assembly according to the sixth aspect is configured so that the crank assembly body includes at least one of a crank arm, a crank shaft, a sprocket carrier, and a plurality of sprockets.

With the crank assembly according to the seventh aspect, it is possible to accurately calculate at least one of human input force and human input power even when the crank assembly body includes at least one of multiple options to which the strain sensor can be coupled.

In accordance with an eighth aspect of the present disclosure, the crank assembly according to the seventh aspect is configured so that the sprocket carrier and at least one of the plurality of sprockets are formed as a one piece member.

With the crank assembly according to the eighth aspect, it is possible to have fewer parts and/or fasteners. In addition, or alternatively, it is possible to provide a stronger sprocket carrier/sprocket member.

In accordance with a ninth aspect of the present disclosure, the crank assembly according to any of the sixth to eighth aspects further comprises a crank rotational speed sensor coupled to the crank assembly body to detect the third information.

With the crank assembly according to the ninth aspect, it is possible to accurately provide the third information.

In accordance with a tenth aspect of the present disclosure, the crank assembly according to any of the sixth to ninth aspects is configured so that the at least one strain sensor includes a plurality of strain gauges to detect the first information.

With the crank assembly according to the tenth aspect, it is possible to accurately provide the first information.

In accordance with an eleventh aspect of the present disclosure, the crank assembly according to the tenth aspect is configured so that the computer memory device has the plurality of the prestored correction factors associated with the plurality of strain gauges. The processor is configured to calculate at least one of the human input force and the human input power by using individual torques detected by the plurality of strain gauges. The at least one of the human input force and the human input power is corrected with the plurality of the prestored correction factors.

With the crank assembly according to the eleventh aspect, it is possible to even more accurately calculate at least one of human input force and human input power.

In accordance with a twelfth aspect of the present disclosure, the crank assembly according to any of the seventh to eleventh aspects is configured so that the electronic device is provided on one of the crank arm, the crank shaft, the sprocket carrier, and the plurality of sprockets.

With the crank assembly according to the twelfth aspect, it is possible to provide the electronic device on one of numerous elements allowing for versatile mounting with respect to the strain sensor.

In accordance with a thirteenth aspect of the present disclosure, the crank assembly according to the twelfth aspect is configured so that the electronic device is provided on the crank arm.

With the crank assembly according to the thirteenth aspect, it is possible to mount the electronic device close to the location where strain from the rider is actually applied to the crank assembly.

In accordance with a fourteenth aspect of the present disclosure, the crank assembly according to any of the seventh to thirteenth aspects is configured so that the strain sensor is provided to the crank arm.

With the crank assembly according to the fourteenth aspect, it is possible to accurately measure strain applied to the crank assembly by measuring strain close to the location where strain from the rider is actually applied to the crank assembly.

In accordance with a fifteenth aspect of the present disclosure, the crank assembly according to any of the seventh to fourteenth aspects further comprises an additional strain sensor provided to an additional crank arm.

With the crank assembly according to the fifteenth aspect, it is possible to accurately measure strain applied to the crank assembly from the additional crank arm by measuring strain close to the location where strain from the rider is actually applied to the additional crank arm of the crank assembly.

In accordance with a sixteenth aspect of the present disclosure, the crank assembly according to any of the sixth to fifteenth aspects further comprises a wireless transmitter that wirelessly communicates with a wireless receiver of a display, and transmits information of at least one of the human input force and the human input power to the wireless receiver.

With the crank assembly according to the sixteenth aspect, it is possible to for a user to view information related to at least one of the human input force and the human input power. In addition, or alternatively, it is possible to for user to view how the information is being used to control one or more components. In addition, a clean simple installation is possible due to lack wires.

In accordance with a seventeenth aspect of the present disclosure, a drive train is provided that comprises the crank assembly according to any of the sixth to sixteenth aspects. The drive train further comprises a vehicle sensor arranged to detect a parameter associated with a gear engagement state of the plurality of sprockets with a chain as the second information.

With the drive train according to the seventeenth aspect, it is possible to accurately provide the second information.

In accordance with an eighteenth aspect of the present disclosure, the drive train according to the seventeenth aspect is configured so that the vehicle sensor includes a vehicle transmission position sensor that detects a movement of an electric motor or a movement of a reduction gear of the electric motor of a transmission device as the parameter associated with the gear engagement state.

With the drive train according to the eighteenth aspect, it is possible to accurately provide the second information using information about the transmission device which only indirectly is based on vehicle speed.

In accordance with a nineteenth aspect of the present disclosure, the drive train according to the seventeenth aspect is configured so that the vehicle sensor includes a vehicle speed sensor that detects a rotational speed of a wheel of the human-powered vehicle as the parameter associated with the gear engagement state.

With the drive train according to the nineteenth aspect, it is possible to accurately provide the second information using information about the vehicle speed which only indirectly is based on transmission state.

Also, other objects, features, aspects and advantages of the disclosed electronic device, the disclosed crank assembly and the disclosed drive train will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

Figure 1:
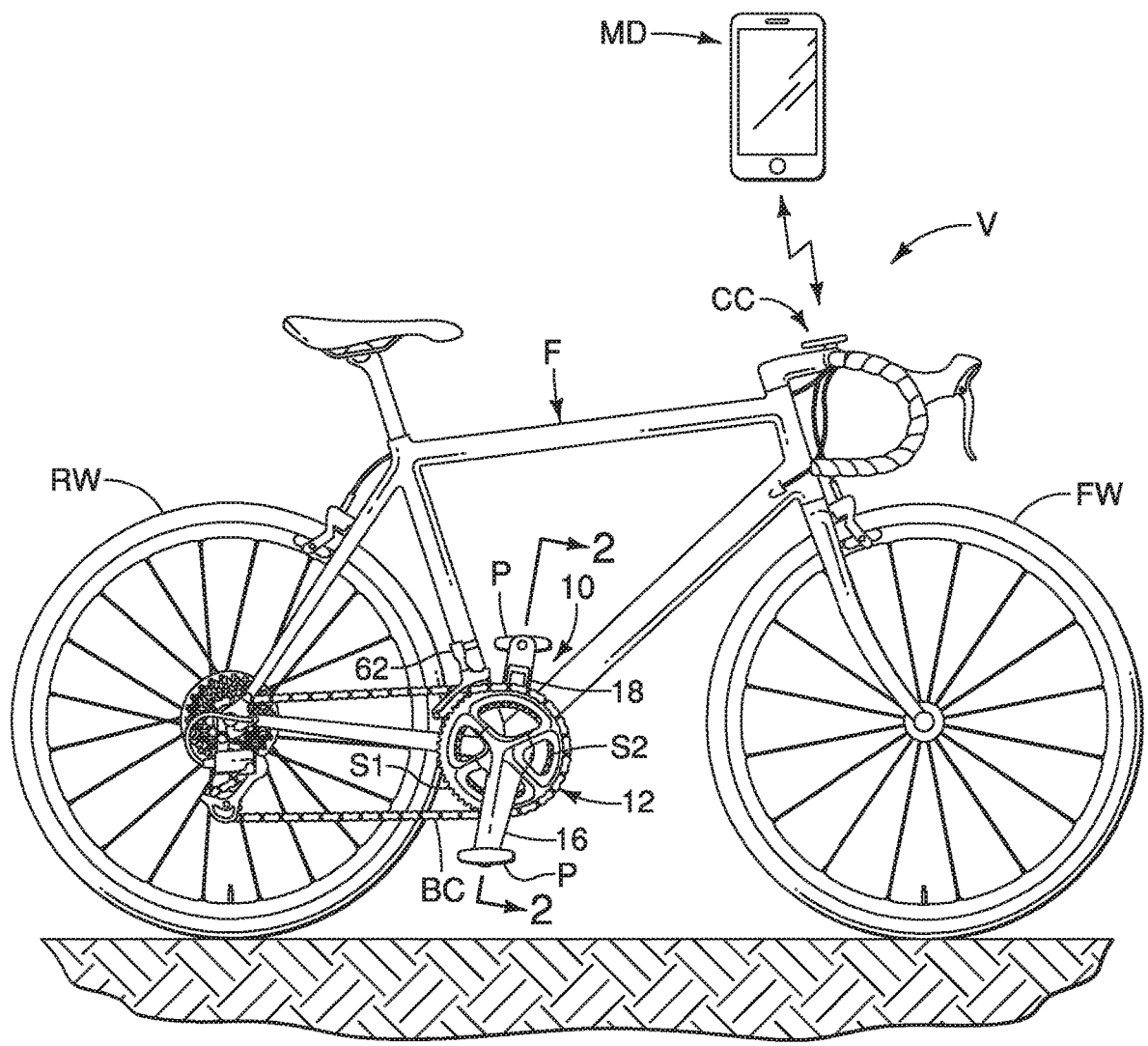
FIG. 1 is a side elevational view of a bicycle (i.e., a human-powered vehicle) having a drive train that includes a crank assembly with an electronic device in accordance with an illustrated embodiment.

Referring initially to FIG. 1, a human-powered vehicle V is illustrated in accordance with the illustrated embodiment. Here, in the illustrated embodiments, the human-powered vehicle V is a vehicle that can be driven by at least human driving force. The human-powered vehicle V includes, for example, a bicycle. The number of wheels in the human-powered vehicle V is not limited. The human-powered vehicle V includes, for example, a monocycle and a vehicle including three or more wheels. The bicycle includes, for example, various types of bicycles such as a mountain bike, a road bike, a city bike, a cargo bike, and a recumbent bike and an electric assist bicycle (E-bike). In the embodiment, the human-powered vehicle V refers to a bicycle.

Figure 6:
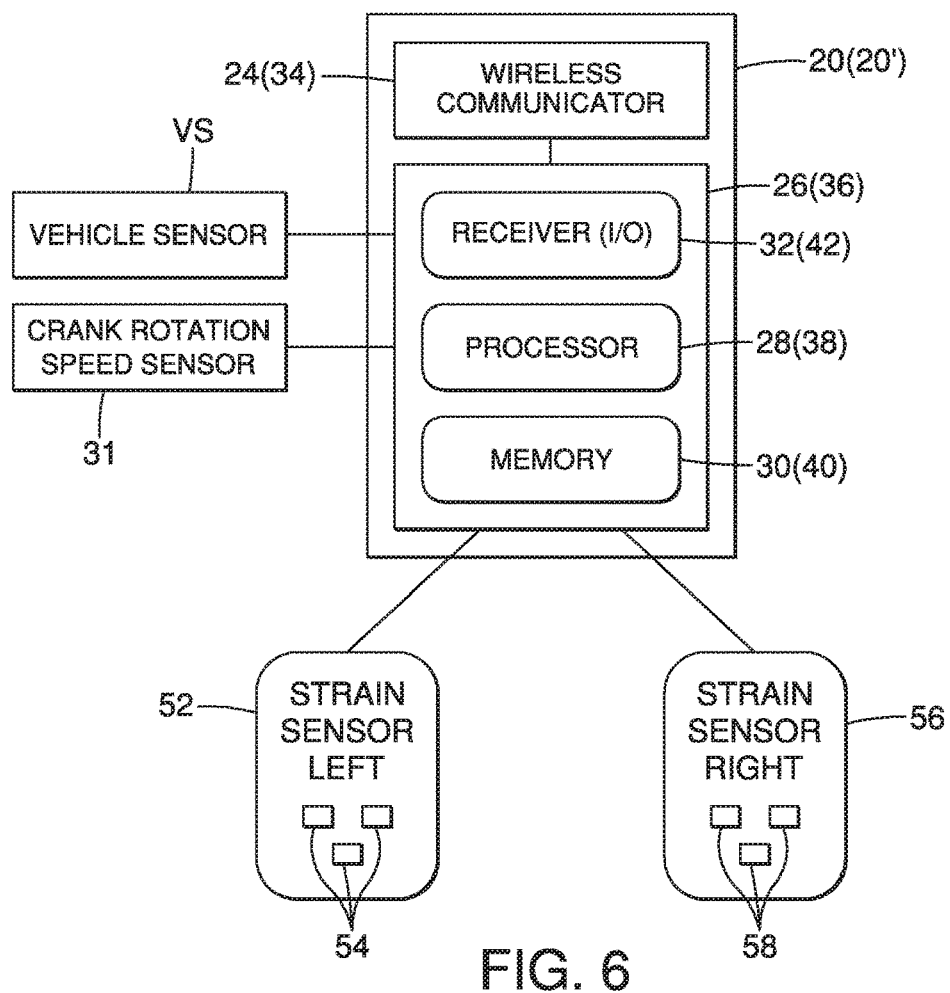
FIG. 6 is a block diagram of the electronic device, right strain sensor, left strain sensor, crank arm rotation sensor, wireless communicator, and vehicle sensor of the crank assembly of the drive train illustrated in FIGS. 1-5.
Figure 7:
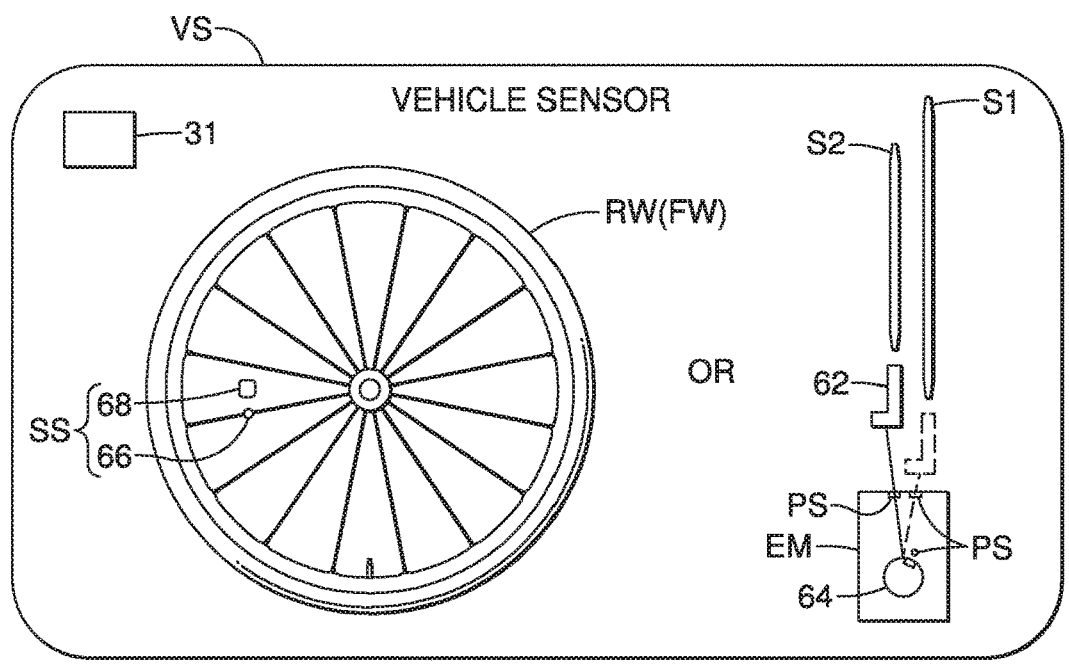
FIG. 7 is a block diagram showing examples of vehicles sensors in accordance with the illustrated embodiment.

The human-powered vehicle V includes, among other things, a drive train 10 equipped with a bicycle crank assembly 12 in accordance with a first embodiment. Thus, the drive train 10 comprises the crank assembly 12. The bicycle crank assembly 12 is rotatably mounted to a bicycle frame F of the vehicle V in a conventional manner. As shown in FIG. 1, the vehicle V is a road style bicycle that includes various electrically controlled components. Here, the vehicle V has a chain drive that has a bicycle chain BC for driving the rear wheel RW. In particular, the bicycle crank assembly 12 is provided with two bicycle sprockets S1 and S2 and a pair of bicycle pedals P. When a rider applies a pedaling force on the bicycle pedals P, a pedaling force is transmitted to the bicycle crank assembly 12, which rotates the bicycle sprockets S1 and S2 to move the bicycle chain BC and propel the vehicle V in a conventional manner. The vehicle V can be a mountain style bicycle or city style bicycle. The drive train 10 further comprises a vehicle sensor VS arranged to detect a parameter associated with a gear engagement state of the plurality of sprockets S1 and S2 with a chain BC as the second information. The vehicle sensor VS is shown in FIGS. 6-7 and explained in more detail below. There are two examples of potential vehicle sensors explained below.

As shown in FIGS. 1-4, the bicycle crank assembly 12 also includes a crank shaft 14, a right or first crank arm 16, a left or second crank arm 18, a sprocket carrier SC, the sprockets S1 and S2, an electronic device 20, a first electrical unit 21, a second electrical unit 22 and a third electrical unit 23 in accordance with an embodiment of the present invention. The mechanical parts of the crank assembly 12, e.g., the crank shaft 14, the crank arms 16 and 18, the sprocket carrier SC, and the sprockets S1 and S2, form parts of a crank assembly body 13. On the other hand, the electrical components, e.g., the electronic device 20, the electrical units 21 and 22, and a third electrical unit 23, form parts attached to the crank assembly body 13. Thus, the crank assembly 12 comprises the crank assembly body 13. The crank assembly 12 comprises the electronic device 20. The crank assembly body 13 includes at least one of a crank arm 16, 18, a crank shaft 14, the sprocket carrier SC, and a plurality of sprockets S1 and S2. The sprocket carrier SC and at least one of the plurality of sprockets S1 and S2 are preferably formed as a one piece member. The electronic device 20 is provided on one of the crank arms 16, 18, the crank shaft 14, the sprocket carrier SC, and the plurality of sprockets S1 and S2.

Figure 2:
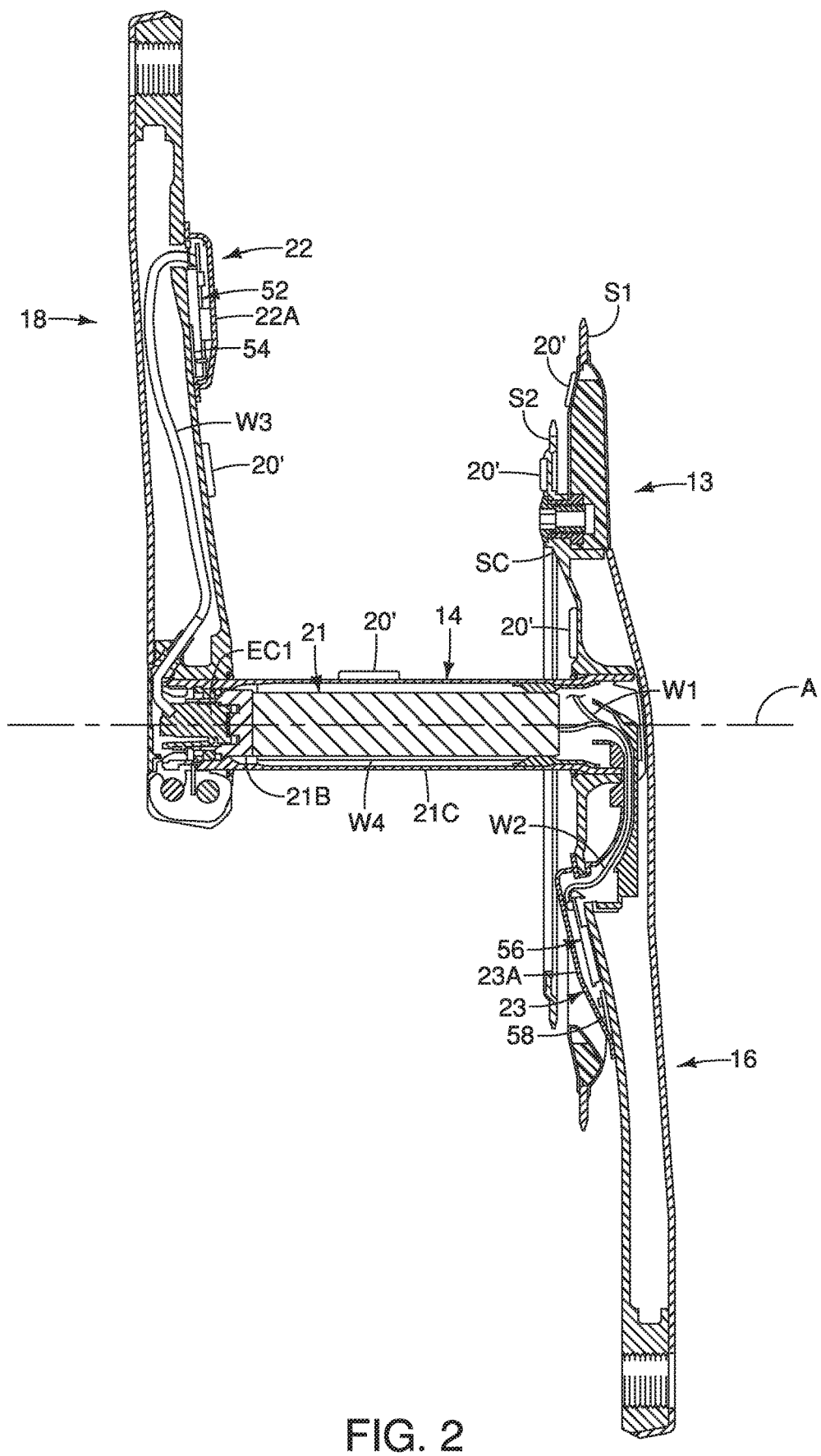
FIG. 2 is a a is a cross-sectional view of the crank assembly illustrated in FIG. 1 as seen along section line 2-2 of FIG. 1 in which a battery unit is disposed in the crankshaft, a first electrical component is attached to the left crank arm, a second electrical component is attached to the right crank arm and a wireless communication unit is attached to the right crank arm.

In the illustrated embodiment, the electronic device 20 is provided on the crank arm 18. However, as seen in FIG. 2, a modified electronic device 20' can be mounted on either one of the crank arms 16, 18, the crank shaft 14, the sprocket carrier SC, or one of the plurality of sprockets S1 and S2. In fact, in FIG. 3 the electronic device is mounted adjacent the sprocket carrier SC, making a modification to be mounted thereto relatively easy. In such cases, the electronic device 20' can wirelessly communicate with other electrical components or hollow passageways can be formed for the passage of electrical wires. In any case, the location of the electronic device 20 is not limited to the position(s) shown herein.

Figure 3:
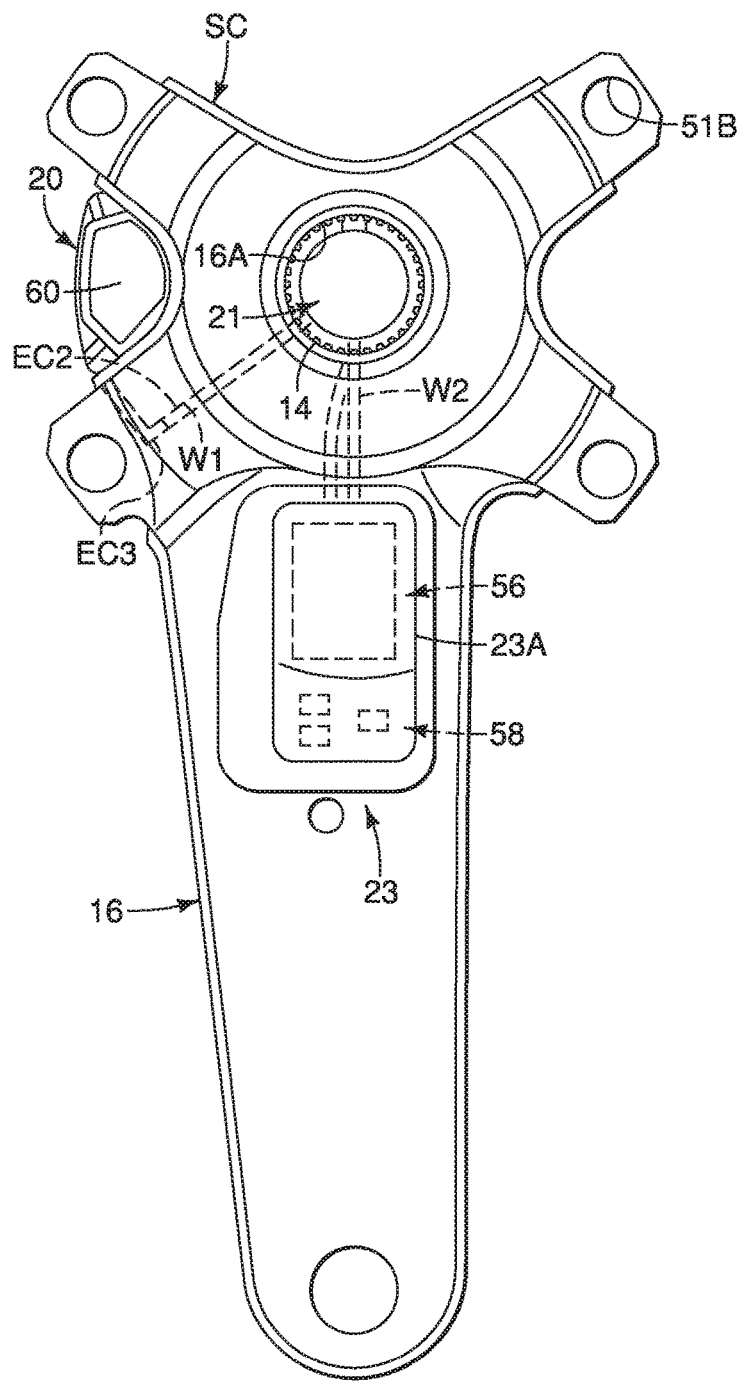
FIG. 3 is an inside elevational view of the right crank arm of the crank assembly illustrated in FIGS. 1 to 2.
Figure 4:
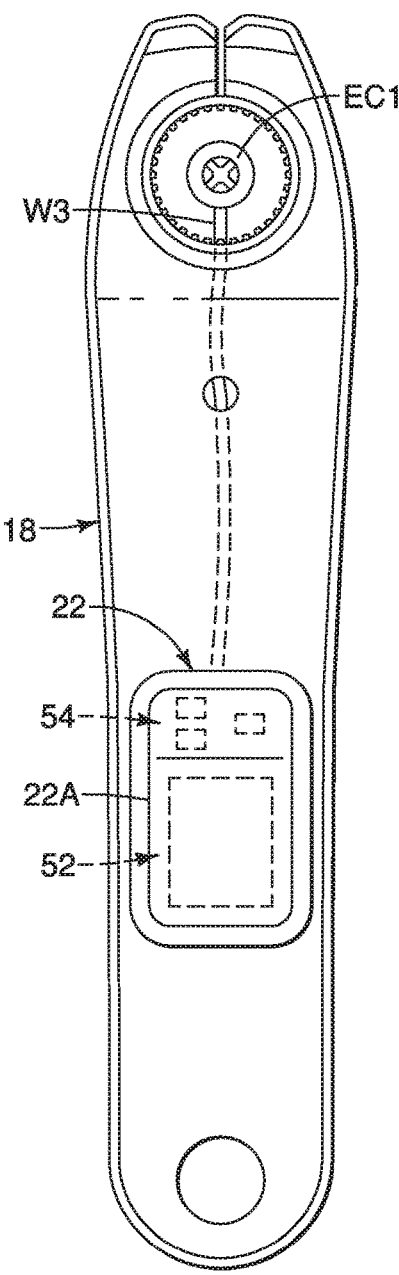
FIG. 4 is an inside elevational view of the left crank arm of the crank assembly illustrated in FIGS. 1 to 2.

The sprocket carrier SC connects the sprockets S1 and S2 to the right crank arm 16. The sprocket carrier SC is illustrated as a one-piece member with the sprocket S2. However, the sprocket carrier SC can be integrally formed with both of the sprockets S1 and/or S2 as a one-piece member, or the sprocket carrier SC can be separate from the sprockets S1 and S2. The crank shaft 14 has end portions with the first and second crank arms 16 and 18 fixedly attached thereto in a perpendicular manner in a conventional manner. In the illustrated embodiment, the crank shaft 14 has an interior space extending between the first and second crank arms 16 and 18. As seen in FIG. 2, the bicycle sprockets S1 and S2 are mounted on to the first crank arm 16 for driving the bicycle chain BC. Only one sprocket can be mounted on the first crank arm 16. As seen in FIGS. 2-4, the first and second crank arms 16 and 18 have threaded openings for attaching the bicycle pedals P thereto in a conventional manner. Thus, when a rider applies a pedaling force on the bicycle pedals P, a pedaling force is transmitted to the first and second crank arms 16 and 18, which rotate the bicycle sprockets S1 and S2 to move the bicycle chain BC and propel the vehicle V in a conventional manner.

Figure 5:
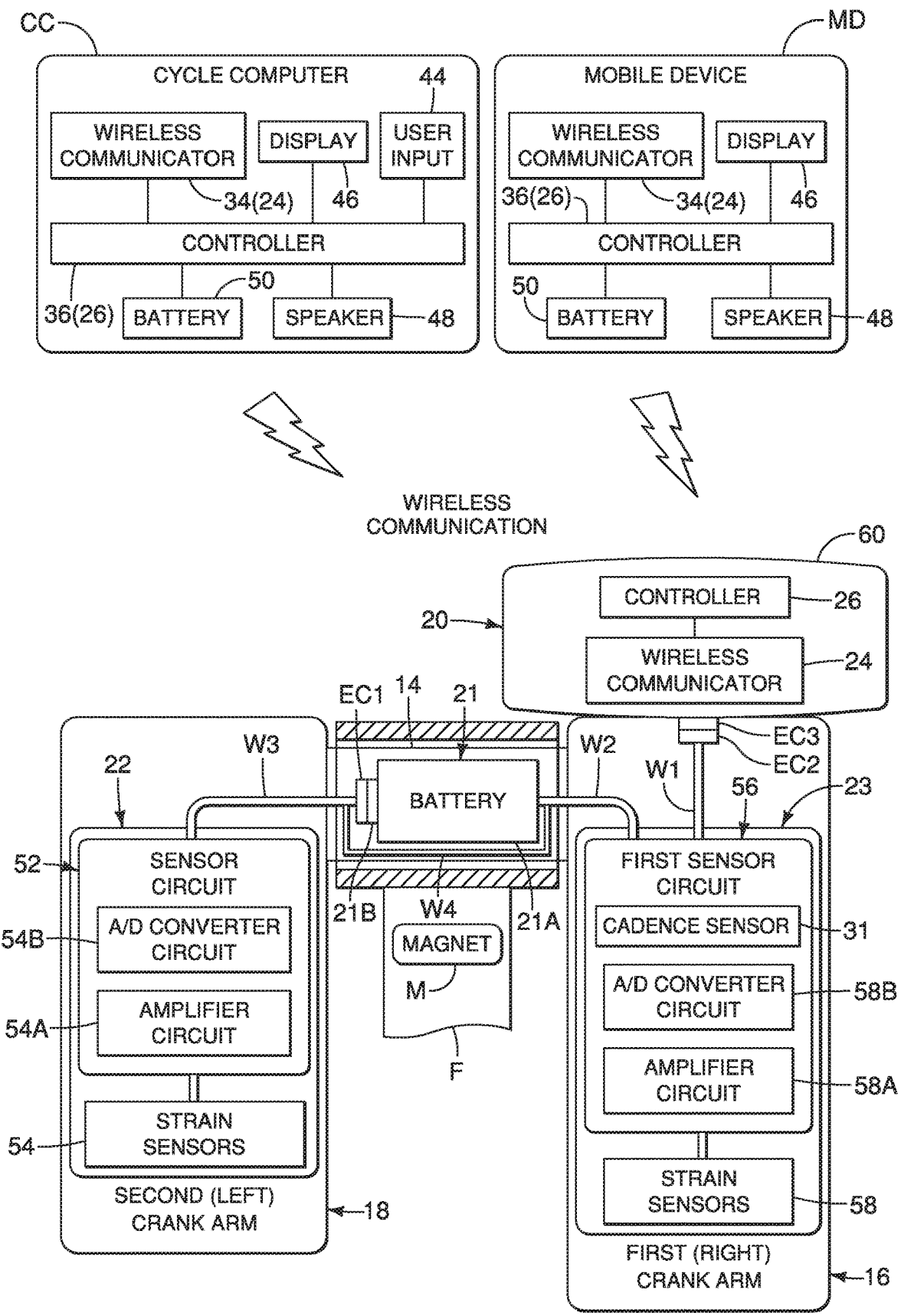
FIG. 5 is a block diagram of an electrical communication system in which the wireless communication unit of the right crank arm wirelessly communicated with a cycle computer and/or a mobile device.

In one embodiment, as shown in FIGS. 3 and 5, the first crank arm 16 is provided with the electronic device 20 detachably installed on the first crank arm 16. The electronic device 20 can be mounted on/in first crank arm 16 without being detachable. However, the electronic device 20 can be mounted in other locations, as explained below. In this embodiment, the electronic device 20 communicates with other components to calculate human input force and/or human input power that are inputted to a drive train 10 of a human powered vehicle V. The calculated human input force and/or human input power can be used to control one or more components, or can be displayed to assist a rider in training and/or controlling components of the vehicle V, as explained in more detail below.

In this embodiment, as best seen in FIGS. 2 and 5, the crank shaft 14 is a hollow shaft that houses the first electrical unit 21. In the first embodiment, the first electrical unit 21 preferably includes an electrical power source 21A (e.g., a battery, a capacitor, etc.), an electrical connector 21B, a housing 21C and a transmission line W4. However, the electrical power source 21A can be housed in the housing 60 or other portions. The housing 21C is a cylindrical member which accommodates the electrical power source 21A and the transmission line W4. The transmission line W4 electrically connects between a transmission line W2 and a transmission line W3. The first electrical unit 21 is disposed in the interior space of the crank shaft 14. The electrical power source 21A can be, for example, a rechargeable dry cell battery. Alternatively, power for the electrical components of the bicycle crank assembly 12 can also be provided by one or more solar cells that are affixed to the bicycle crank assembly 12. Alternatively, power for the electrical components of the bicycle crank assembly 12 can be generated from piezoelectric devices or any combination of batteries, solar cells, piezoelectric devices, and other suitable power sources.

Referring to FIGS. 2-5, the second electrical unit 22 is disposed on the second crank arm 18. The third electrical unit 23 is disposed on the first crank arm 16. The electronic device 20 is electrically connected to the third electrical unit 23 by a transmission line W1, while the first electrical unit 21 is electrically connected to the third electrical unit 23 by the transmission line W2. Also, the first electrical unit 21 is electrically connected to the second electrical unit 22 by the transmission line W3. In this way, the first electrical unit 21 supplies electrical power to the electronic device 20 and the second and third electrical units 22 and 23. While the transmission lines W1 to W3 are electrical cords that each includes at least two electrical conductors (a ground wire and a voltage wire) in this embodiment, the transmission lines W1 to W3 are not limited to that configuration. Rather, optical lines, signal lines and/or electrical conductors can be used for the transmission lines W1 to W3.

Referring still to FIGS. 2-5, the second and third electrical units 22 and 23 are configured as pedaling force detectors. In other words, the second electrical unit 22 constitutes a pedaling force detector that detects a pedaling force applied to the second crank arm 18, while the third electrical unit 23 constitutes a pedaling force detector that detects a pedaling force applied to the first crank arm 16. The second electrical unit 22 provides pedaling force information to the electronic device 20 via the first electrical unit 21 and the third electrical unit 23. The third electrical unit 23 provides pedaling force information to the electronic device 20 directly. Then the electronic device 20 calculates human input force and/or human input power using the pedalling force information and other information as explained below. The calculated human input force and/or human input power can be used to control other components as explained below. In addition, optionally, the calculated human input force and/or human input power can be wirelessly communicated with the cycle computer CC or mobile device MD so that the information can be conveyed to the rider.

In the illustrated embodiment, the electric power is supplied from the first electrical unit 21 to the electronic device 20 and the second and third electrical units 22 and 23 via power lines (i.e., the transmission lines W1 to W3). Furthermore, the electronic device 20 can receive information signals from the first, second and third electrical units 21, 22 and 23 via electrical communication lines (i.e., the transmission lines W1 to W3). In the illustrated embodiment, the transmission lines W1 to W3 include at least four electrical conductors for transmitting power and signal separately. Thus, the transmission lines W1 to W3 have separate signal lines provided for transmitting data in addition to a ground wire and a voltage wire. The transmission line W3 preferably includes an electrical connector EC1 that electrically connects to the electrical connector 21B of the first electrical unit 21. Preferably, the other end of the transmission line W1 has an electrical connector EC2 (FIG. 5) that mates with an electrical connector EC3 of the electronic device 20.

Also, power line communication technology can be used for communicating between the electronic device 20 and the second electrical unit 22 via the first electrical unit 21 and the third electrical unit 23, and between the electronic device 20 and the third electrical unit 23, if needed and/or desired. Basically, power line communication (PLC) carries data on an electrical conductor or transmission line that is also used simultaneously for electric power transmission or electric power distribution to the electric components (e.g., the electronic device 20 and the first, second and third electrical units 21, 22 and 23). The PLC technology uses unique identifying information such as a unique identifier that is assigned to each of the electrical components (i.e., the electronic device 20 and the first, second and third electrical units 21, 22 and 23). Each of the electrical components (i.e., the electronic device 20 and the first, second and third electrical units 21, 22 and 23) includes a memory in which the unique identifying information is stored. Based on the unique identifying information, each of the electrical components can recognize, based on the unique identifying information, information signals which are necessary for itself among information signals transmitted via the transmission (electrical communication) lines W1 to W3.

Referring now to FIGS. 3-6, diagrams of parts of the bicycle crank assembly 12 are illustrated. In this embodiment, the electronic device 20 includes a wireless communicator 24 and a controller 26. The wireless communicator 24 includes a wireless receiver-wireless transmitter that uses wireless technology such as ultra-wide band communications, ANT communications, ANT+ communications or Bluetooth communications to communicate with wireless components (e.g., derailleurs), the cycle computer CC and/or the mobile device MD. The controller 26 is a microcomputer that includes a central processing unit (CPU) or processor 28 and other conventional components such as a memory device 30 and an I/O interface 32. The I/O interface 32 may include an input interface circuit and an output interface circuit, but at least includes an input interface circuit. Thus, the I/O interface 32 is a receiver. The memory device 30 may include storage devices such as a ROM (Read Only Memory) device and/or a RAM (Random Access Memory) device.

The controller 26 calculates the human input force and/or human input power. The wireless communicator 24 transmits the calculated human input force and/or human input power to the cycle computer CC and/or mobile device MD. It is possible that the cycle computer and/or mobile device MD can be omitted. In such a case, the controller 26 can include an automatic shifting program for automatically shifting gears of the vehicle V based on the pedaling force information and/or other bicycle riding conditions that are detected with other sensors (not shown). However, preferably at least one of the cycle computer CC and mobile device MD is present. When at least one of the cycle computer CC and mobile device MD is present, it is possible for the controller 26 to be omitted. In such a case, a controller of the cycle computer CC and/or the mobile device MD can calculate the human input force and/or human input power, and display the information for use by the rider and/or control other components in the same manner as the controller 26. In such a case, the electronic device 20 is a remote component that is separated from the drive train 10. The electronic device 20 is one of a cycling computer CC or a mobile device MD. In such a case, the electronic device 20 further comprises a display 46 in communication with the processor 28. Regardless, the processor 28 is configured to output a signal related to at least one of the human input force and the human input power to the display 46.

The cycle computer CC and mobile device MD are different. However, each preferably includes at least one-way wireless communicator 34 (i.e., a wireless receiver-wireless transmitter that uses wireless technology such as ultra-wide band communications, ANT communications, ANT+ communications or Bluetooth communications) and a controller 36. The controller 36 is a microcomputer that includes a central processing unit (CPU) or processor 38 and other conventional components such as a memory device 40 and an I/O interface 42. The I/O interface 42 may include an input interface circuit and an output interface circuit, but at least includes an input interface circuit. Thus, the I/O interface 42 is a receiver. The memory device 40 may include storage devices such as a ROM (Read Only Memory) device and/or a RAM (Random Access Memory) device. Typically, the cycle computer CC also includes a user interface or input 44, a display 46, and a speaker 48. Preferably, the cycle computer CC includes other conventional parts such as a replaceable battery 50. The replaceable battery can instead be a non-replaceable and rechargeable battery 50. Also, the controller 36 is programmed to display the pedaling force information on the display 46. In the case of the mobile device MD, the display 46 can be a touch screen to also function as an input device. The controller 36 can include other programs as needed and/or desired. For example, the controller 36 can include an automatic shifting program for automatically shifting gears of the vehicle V based on the pedaling force information and/or other bicycle riding conditions that are detected with other sensors (not shown). Due to this structure, the crank assembly 12 further comprises a wireless transmitter (e.g., wireless communicator 24) that wirelessly communicates with a wireless receiver (e.g., wireless communicator 34) of the display 46, and transmits information of at least one of the human input force and the human input power to the wireless receiver 34.

In view of the above, an electronic device 20 is provided for calculating at least one of a human input force and a human input power that are inputted to a drive train 10 of a human powered vehicle V. The electronic device 20 comprises the receiver 32, the computer memory device 30, and the processor 28. The receiver 32 is configured to receive first information with respect to torque applied to the drive train 10, and to receive at least one of second information with respect to a gear engagement state of a plurality of sprockets S1 and S2 with a chain BC and third information with respect to a crank rotational speed of the drive train 10. The computer memory device 30 has a plurality of prestored correction factors with respect to the gear engagement state. The receiver 32 is configured to receive at least the first information and the second information. Preferably, the receiver 32 is configured to receive the first information, the second information, and the third information.

The processor 28 is configured to calculate at least one of the human input force and the human input power. The human input force is applied to the drive train 10 based on the first information, the second information and at least one of the prestored correction factors. The human input power is based on the first information, the second information, the third information, and at least one of the prestored correction factors. The computer memory device 30 has the plurality of the prestored correction factors associated with a plurality of strain sensors 54 and 58 coupled to the drive train 10 to detect the first information. The processor 28 is configured to calculate at least one of the human input force and the human input power by using individual signals detected by the plurality of strain sensors 54 and 58 as a part of the first information. The at least one of the human input force and the human input power is corrected with the plurality of the prestored correction factors. This is explained in more detail below with reference to FIGS. 12-13.

Basically, as seen in FIGS. 2-5, the second electrical unit 22 basically includes a measuring device or sensor circuit 52 with strain sensors 54 for measuring the pedaling force applied to the second crank arm 16. The third electrical unit 23 basically includes a cadence sensor 31, and a measuring device or sensor circuit 56 with strain sensors 58 for measuring the pedaling force applied to the first crank arm 18. The cadence sensor 31 (e.g., a reed switch) detects a magnetic field of a magnet M that is attached to the vehicle V. Alternatively, the cadence sensor 31 can be mounted at any suitable location to detect the magnetic field of the magnet M. The cadence sensor 31 can include an accelerometer instead of the reed switch mentioned above. The cadence sensor 31 is electrically connected to the wireless communicator 24. The wireless communicator 24 is configured to wirelessly output cadence information received from the cadence sensor 31 to the cycle computer CC and/or the mobile device MD. The strain sensor 54 is provided to the crank arm 16. The strain sensor 58 is provided to the crank arm 18. Thus, the crank assembly 12 further comprises an additional strain sensor 54, 58 provided to an additional crank arm 16, 18.

The cadence sensor 31 can be disposed on the electronic device 20 instead of being disposed on the sensor circuit 56. The electronic device 20 is electrically connected to the sensor circuits (measuring devices) 52 and 56 for receiving signals indicative of the pedaling force applied to the first and second crank arms 16 and 18. In this way, the second and third electrical units 22 are in wireless communication with the cycle computer CC and/or the mobile device MD via the wireless communicator 24 of the electronic device 20 to provide pedaling force information to the rider. The crank assembly 12 further comprises a crank rotational speed sensor 31 coupled to the crank assembly body 13 to detect third information. The third information is crank rotation speed information.

In this embodiment, the sensor circuit 52 is mounted on the second crank arm 18. The sensor circuit 52 is electrically connected to the strain sensors 54 that is also mounted on the second crank arm 18. The electronic device 20 is electrically connected to the sensor circuit 52 via the transmission lines W1 to W3 and the first electrical unit 21 to provide data from the sensor circuit 52 to the wireless communicator 24. The sensor circuit 52 includes an amplifier circuit 54A that amplifies a strain signal received from and detected by the strain sensors 54. The sensor circuit 52 further includes an A/D converter circuit 54B that transforms the strain signal into a data signal indicative of the pedaling force applied to the second crank arm 18. In other words, the sensor circuit 52 interprets the strain signal(s) to generate pedaling force information that is transmitted to the electronic device 20. Thus, the crank assembly 12 further comprises a crank assembly body 13, and at least one strain sensor 54, 58 coupled to the crank assembly body 13 to detect the first information.

Similarly, the sensor circuit 56 is mounted on the first crank arm 16. The sensor circuit 56 is electrically connected to the strain sensors 58 that is also mounted on the first crank arm 16. The electronic device 20 is electrically connected to the sensor circuit 56 via the transmission line W1 to provide data from the sensor circuit 56 to the wireless communicator 24. The sensor circuit 56 includes an amplifier circuit 58A and an A/D converter circuit 58B. The amplifier circuit 58A amplifies a strain signal received from and detected by the strain sensors 58, and the A/D converter circuit 58B then transforms the strain signal into a data signal indicative of the pedaling force applied to the first crank arm 16. In other words, the sensor circuit 56 interprets the strain signal(s) to generate pedaling force information that is transmitted to the electronic device 20.

In this embodiment, the electronic device 20 includes a housing 60 that encloses the wireless communicator 24 and other electrical components such as the wireless communicator 24 and the components of the controller 26 as needed and/or desired. The housing 60 is preferably made of a material, such as plastic. A printed circuit board (not shown) may be used to electrically connect the various components such as the wireless communicator 24 and the controller 26 within the housing 60.

The second electrical unit 22 includes a housing 22A that encloses the sensor circuit 52 and the strain sensors 54. The housing 22A is disposed on the inside surface facing the bicycle frame F in a state where the crank assembly 12 is mounted on the vehicle V. The housing 22A is fixed to the inside surface of the second crank arm 18 by adhesive. The second electrical unit 22 is preferably made of a material, such as plastic. The third electrical unit 23 includes a housing 23A that encloses the first circuit 56 and the strain sensors 58. The housing 23A is disposed on the inside surface facing the bicycle frame F in a state where the crank assembly is mounted on the vehicle V. The housing 23A is fixed to the inside surface of the first crank arm 16 by adhesive. The third electrical unit 22 is preferably made of a material, such as plastic, that allows magnetic flux to pass therethrough to activate the cadence sensor 31 during the pedaling of the first and second crank arms 16 and 18.

In this embodiment, one end of the transmission line W1 is connected to an electrical connector that is wired to the printed circuit board of the electronic device 20. The transmission line W1 extends from the electronic device 20 and through one of the sprocket mounting arms of the sprocket mounting structure (sprocket carrier SC) to the crankshaft receiving opening 16A. Then, the transmission line W1 extends through the first crank arm 16 and is then directly connected to the printed circuit board of the sensor circuit 56. The transmission line W2 has one end directly connected to the printed circuit board of the sensor circuit 56 and the other end directly connected to the first electrical unit 21, which in turn is electrically connected to the sensor circuit 52 via the transmission line W3. Thus, the first electrical unit 21 and the transmission lines W1 to W3 transmit pedaling force information between the electronic device 20 and the sensor circuits 52 and 56.

Referring now to FIGS. 6-7, the electronic device is preferably electrically connected or wirelessly connected to other electronic components. Specifically, the electronic device 20 is electrically or wirelessly connected to a crank rotation speed sensor (the cadence sensor 31), a vehicle sensor VS, and the first, second and third electrical units 21, 22 and 23 (the strain sensors 54 and 58). As shown in FIG. 7, in the illustrated embodiment, the vehicle sensor can be a transmission position sensor PS or a vehicle speed sensor SS and/or the cadence sensor. Transmission position sensors, vehicle speed sensors and cadence sensors are generally conventional and thus will not be discussed and/or illustrated in detail herein.

In this embodiment, if the vehicle sensor VS is the positions sensor PS, the transmission position sensor PS detects movement of a transmission device (e.g., a front derailleur 62) or some part of the transmission device (e.g., a reduction gear 64) of the transmission device (e.g., front derailleur 62). In this way, the position sensor PS can send a signal to the electronic device 20 indicating whether the chain BC is on the sprocket S1 or S2 based on the position of the transmission device 62 or part 64 of the transmission device. Thus, the vehicle sensor VS includes a vehicle transmission position sensor PS that detects a movement of an electric motor EM or a movement of a reduction gear 64 of the electric motor EM of a transmission device 62 as the parameter associated with the gear engagement state.

In this embodiment, if the vehicle sensor VS is the speed sensor SS, the speed sensor SS detects a rotational speed of the rear wheel RW or the front wheel FW. In particular, a magnet 66 is mounted to one of the wheels, RW, FW, and a sensor (detector or reed switch) 68 is mounted to the frame F to detect the magnetic field of the magnet 66 and send a signal to the electronic device 20 in a conventional manner. The electronic device 20 can then calculate the vehicle speed based on the rotation speed of the wheel RW, FW received from the sensor 68 and the wheel circumference which is stored in the electronic device 20. The speed of the vehicle V can then be used to determine whether the chain BC is on the sprocket S1 or S2. More specifically, if the speed is over a predetermined level, it can be determined that the chain BC is on the sprocket S1.

However, alternatively the vehicle sensor VS includes not only the speed sensor SS but also the cadence sensor 31. This can be more reliable than merely using the vehicle speed because of rider cadence preferences. In this case, the vehicle speed determined from the speed sensor SS along with the rider cadence from the cadence sensor 31 can be used to determine the gear engagement state. In this case there should be not exist that same gear ratio in different gear stages, i.e., when the chain BC is on the sprockets S1 and S2. The vehicle sensor VS includes a vehicle speed sensor SS that detects a rotational speed of a wheel RW, FW of the human-powered vehicle V as the parameter associated with the gear engagement state. As used herein "gear engagement state" means whether the chain BC is on the sprocket S1 or S2. Depending on the gear engagement state different corrections can be made.

Regardless, either of the position sensor PS or the speed sensor SS can be used as the vehicle sensor VS. It will also be apparent to those skilled in the art from this disclosure that other types of vehicle sensors can also be used to determine which sprocket the chain BC is disposed on, if needed and/or desired.

Figure 8:
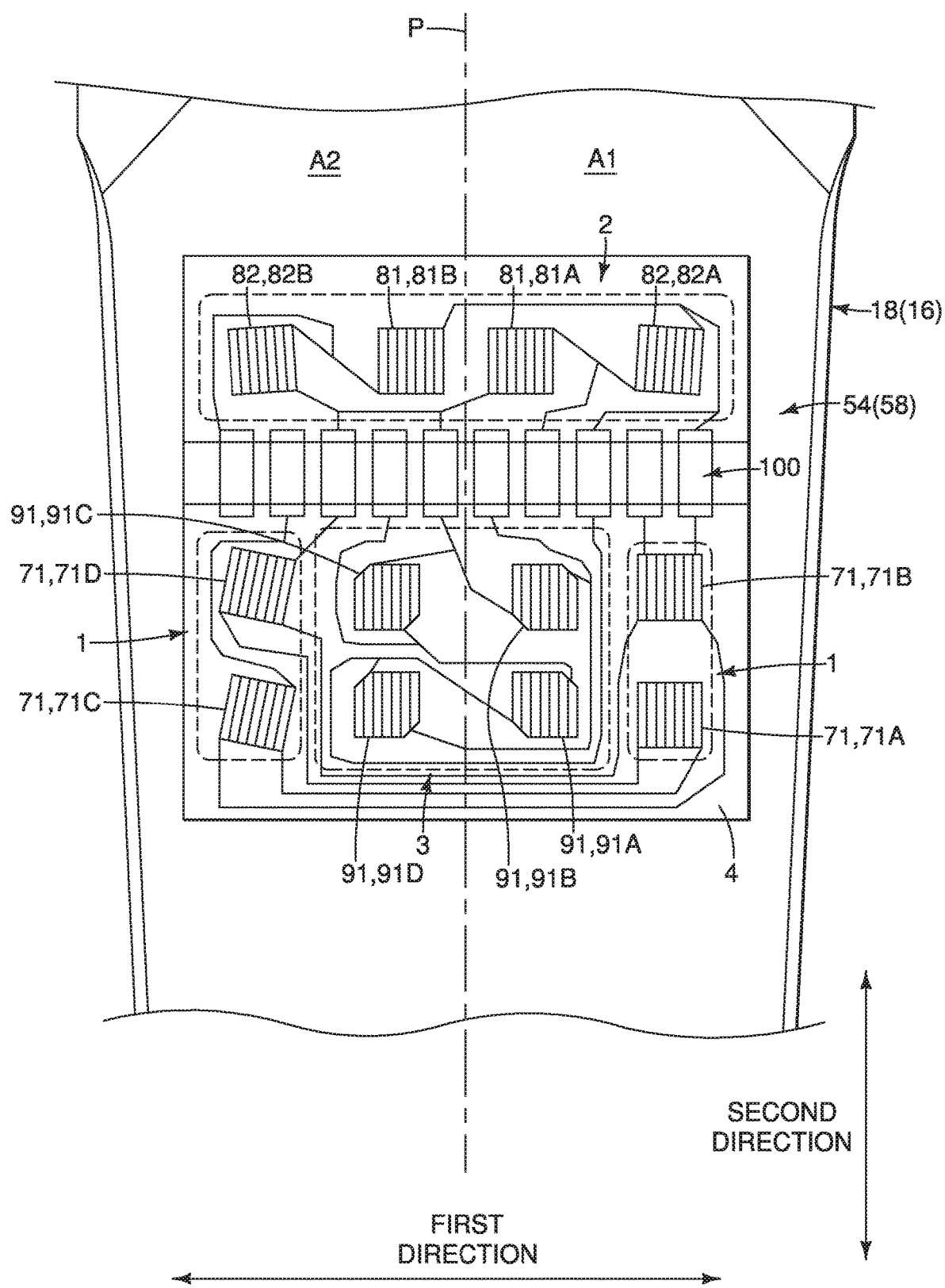
FIG. 8 is an enlarged portion of the crank arm assembly with a diagram showing first to third detecting circuits (strain gauges) on a bicycle crank arm of the bicycle crank arm assembly.

Referring now to FIG. 8-11, the measuring devices or sensor circuits 52 and 56 will now be explained in more detail. In the illustrated embodiment, the sensor circuits 52 and 56 are identical. As shown in FIG. 8, each of the sensor circuits 52 and 56 is a measuring device constructed in accordance with U.S. Patent Publication No. 2017/0176275. However, unlike the first embodiment of U.S. Patent Publication No. 2017/0176275, the measuring devices or sensor circuits 52 and 56 of the illustrated embodiment are modified to provide three (3) measures of force FO and not to provide measures of force Fr or moment (L). Specifically, each of the sensor circuits 52 and 56 is a measuring device attached to one of the crank arms 18 and 16, respectively, and is configured to measure a force acting on that crank arm 18 or 16 when a rider treads the pedals P.

Each measuring device 52 and 56 is capable of measuring the force acting on the crank arm 18 or 16 by detecting a strain occurring in the crank arm 18 or 16 to which it is attached. Since the sensor circuits (measuring devices) 52 and 56 are identical, only the sensor circuit (measuring device) 52 will be discussed herein. However, the descriptions and illustrations of the sensor circuit (measuring device) 52 also apply to sensor circuit (measuring device) 56. The sensor circuit (measuring device) 52 includes a first detecting circuit 1, a second detecting circuit 2 and a third detecting circuit 3. The first, second and third detecting circuits 1, 2 and 3 are mounted to a sheet member 4. The sheet member 4 has electrical insulating properties. The first, second and third detecting circuits 1, 2 and 3 are mounted to the surface or interior of the sheet member 4. The sheet member 4 is attached to the 18. The sheet member 4 is fixed to an attachment surface by, for instance, adhesion.

The first detecting circuit 1 is configured to detect a force (Fθ) acting in a first direction when a load is applied to the crank arm 18 through the pedal shaft. It should be noted that the term "first direction" refers to the direction of a tangent to an imaginary circle arranged about the axis A of the crank shaft 14 at the pedal shaft. Specifically, the first direction is parallel to the width direction of the crank arm 18. On the other hand, the term "second direction" (to be described) refers to a direction parallel to the radial direction of the imaginary circle arranged about the axis A of the crank shaft 14. Thus, the second direction is parallel to the lengthwise direction of the crank arm 18.

The sensor circuit (measuring device) 52 includes at least one first strain sensor 71 that is disposed on the attachment surface of the crank arm 16. Specifically, the first detecting circuit 1 includes four of the first strain sensors 71. The first detecting circuit 1 includes a Wheatstone bridge circuit using the four of the first strain sensors 71. The four of the first strain sensors 71 are herein respectively set as first strain sensors 71A, 71B, 71C and 71D. Each of the first strain sensors 71 is produced in the form of a strain gauge (or gauge) element. Each of the strain gauge elements can be, but is not limited to be, of a thin film type, an electrostatic capacity type, a semiconductor type, a thick film type and a piezoelectric type. Any suitable type of strain gauge element can be herein employed as long as it is capable of detecting a strain of the crank arm.

The attachment surface of the crank arm 16 is divided into a first region A1 and a second region A2 by a center plane P passing containing the axis A of the crank shaft 14. Among the four of the first strain sensors 71, two of them (i.e., the first strain sensors 71A and 71B) are disposed in the first region A1, whereas the remaining two of them (i.e., the first strain sensors 71C and 71D) are disposed in the second region A2. The four of the first strain sensors 71 are connected such that the first strain sensors 71A and 71B compose one of two pairs of facing sides in the Wheatstone bridge circuit whereas the first strain sensors 71C and 71D compose the other of the two pairs of facing sides in the Wheatstone bridge circuit. The two of the first strain sensors 71A and 71B, disposed in the first region A1, are disposed at an interval in the second direction. Additionally, the two of the first strain sensors 71C and 71D, disposed in the second region A2, are also disposed at an interval in the second direction.

In a view seen from a direction parallel to the axial direction of the crank shaft 14, each of the first strain sensors 71 has a detecting direction that forms an angle of less than or equal to 25 degrees together with the second direction. The term "detecting direction" of each of the first strain sensors 71 refers to an extending direction of the resistive element of which each of the first strain sensors 71 is made up.

When described in detail, in the view seen from the direction parallel to the axial direction of the crank shaft 14, each of the two of the first strain sensors 71A and 71B disposed in the first region A1 has a detecting direction that is arranged substantially parallel to the second direction. On the other hand, in the view seen from the direction parallel to the axial direction of the crank shaft 14, each of the two of the first strain sensors 71C and 71D disposed in the second region A2 has a detecting direction that forms an angle of less than or equal to 25 degrees together with the second direction. In the view seen from the direction parallel to the axial direction of the crank shaft 14 each of the two of the first strain sensors 71C and 71D disposed in the second region A2 preferably has a detecting direction that tilts relatively to the second direction at an angle of less than or equal to 25 degrees. The tilt angle is determined in accordance with the shape of the crank arm 16.

The second detecting circuit 2 is also configured to detect a force (Fθ) acting in a first direction when a load is applied to the crank arm 18 through the pedal shaft. The second detecting circuit 2 includes at least one second strain sensor 81 and at least one fourth strain sensor 82. Each of the second and fourth strain sensors 81 and 82 is produced in the form of a strain gauge element. Each of the strain gauge elements can be, but is not limited to be, of a thin film type, an electrostatic capacity type, a semiconductor type, a thick film type and a piezoelectric type. Any suitable type of strain gauge element can be herein employed as long as it is capable of detecting a strain of the crank arm. Specifically, the second detecting circuit 2 includes two of the second strain sensors 81A and 81B and two of the fourth strain sensors 82A and 82B. The second detecting circuit 2 composes a Wheatstone bridge circuit using the two of the second strain sensors 81A and 81B and the two of the fourth strain sensors 82A and 82B. When described in detail, the second strain sensors 81 and the fourth strain sensors 82 are connected such that the second strain sensor 81A and the fourth strain sensor 82A compose one of two pairs of facing sides in the Wheatstone bridge circuit whereas the second strain sensor 81B and the fourth strain sensor 82B compose the other of the two pairs of facing sides in the Wheatstone bridge circuit.

The second strain sensors 81 and the fourth strain sensors 82 are disposed on the attachment surface of the crank arm 16. When described in detail, one of the second strain sensors 81 (i.e., the second strain sensor 81A) and one of the fourth strain sensors 82 (i.e., the fourth strain sensor 82A) are disposed in the first region A1, whereas the other of the second strain sensors 81 (i.e., the second strain sensor 81B) and the other of the fourth strain sensors 82 (i.e., the fourth strain sensor 82B) are disposed in the second region A2. In the view seen from the direction parallel to the axial direction of the crank shaft 14, each of the second strain sensors 81 has a detecting direction that forms an angle of less than or equal to 25 degrees together with the second direction. In the view seen from the direction parallel to the axial direction of the crank shaft 14, the second strain sensors 81 preferably have detecting directions that are arranged substantially parallel to each other. It should be noted that the term "detecting direction" of each of the second strain sensors 81 refers to an extending direction of the resistive material of which each of the second strain sensors 81 is made up.

In the view seen from the direction parallel to the axial direction of the crank shaft 14, each of the fourth strain sensors 82 has a detecting direction that also forms an angle of less than or equal to 25 degrees together with the second direction. In the view seen from the direction parallel to the axial direction of the crank shaft 14, each of the fourth strain sensors 82 preferably has a detecting direction that tilts relatively to the second direction at an angle of less than or equal to 25 degrees. The tilt angle is determined in accordance with the shape of the crank arm 16.

The detecting directions of the two of the fourth strain sensors 82 are different from each other. In other words, the detecting directions of the two of the fourth strain sensors 82 tilt relatively to the second direction in opposite tilt orientations. When described in detail, the detecting directions of the two of the fourth strain sensors 82 are substantially arranged line-symmetrically with reference to the plane P. It should be noted that the term "detecting direction" of each of the fourth strain sensors 82 refers to an extending direction of the resistive material of which each of the fourth strain sensors 82 is made up.

The second strain sensors 81 are respectively disposed at an interval in the first direction. Additionally, these two of the second strain sensors 81 are disposed closer to the plane P than the two of the fourth strain sensors 82 in the first direction. These two of the second strain sensors 81 are preferably disposed between the two of the fourth strain sensors 82. The second strain sensors 81 and the fourth strain sensors 82 are respectively disposed closer to the crank shaft 14 than the first strain sensors 71.

The third detecting circuit 3 is also configured to detect a force (Fθ) acting in a first direction when a load is applied to the crank arm 18 through the pedal shaft. The third detecting circuit 3 includes at least one third strain sensor 91 attached to the attachment surface of the crank arm 16. Specifically, the third detecting circuit 3 includes four of the third strain sensors 91A, 91B, 91C and 91D. The third detecting circuit 3 composes a Wheatstone bridge circuit using the four of the third strain sensors 91. Each of the third strain sensors 91 is produced in the form of a strain gauge element. Each of the strain gauge elements can be, but is not limited to be, of a thin film type, an electrostatic capacity type, a semiconductor type, a thick film type and a piezoelectric type. Any suitable type of strain gauge element can be herein employed as long as it is capable of detecting a strain of the crank arm.

Two of the third strain sensors 91 (i.e., the third strain sensors 91A and 91B) are disposed in the first region A1, whereas the remaining two of them (i.e., the third strain sensors 91C and 91D) are disposed in the second region A2. The two of the third strain sensors 91A and 91B, disposed in the first region A1, are disposed at an interval in the second direction. Additionally, the two of the third strain sensors 91C and 91D, disposed in the second region A2, are disposed at an interval in the second direction. The four of the third strain sensors 91 are connected such that the third strain sensors 91A and 91B compose one of two pairs of facing sides in the Wheatstone bridge circuit whereas the third strain sensors 91C and 91D compose the other of the two pairs of facing sides in the Wheatstone bridge circuit. Each of the third strain sensors 91 is preferably disposed between either pair of the first strain sensors 71 in the first direction.

In the view seen from the direction parallel to the axial direction of the crank shaft 14, each of the third strain sensors 91 has a detecting direction parallel to the first direction. In the view seen from the direction parallel to the axial direction of the crank shaft 14, each of the third strain sensors 91C and 91D has a detecting direction that forms an angle of less than or equal to 25 degrees together with the second direction. The detecting directions of the third strain sensors 91A and 91B disposed in the first region A1 and those of the third strain sensors 91C and 91D disposed in the second region A2 are the same as each other. However, the angles can be different from each other, and can have opposite tilt orientations.

A plurality of electrodes 100 are provided between the first and fourth strain sensors 71 and 82. The electrodes 100 are provided between the third and fourth strain sensors 91 and 82. The electrodes 100 are mounted to the sheet member 4 and are exposed on the surface of the sheet member 4. The electrodes 100 are mounted to the sheet member 4 while being aligned in line along the first direction. At least either of an electrode for applying a rated voltage and a ground electrode can be shared among the first detecting circuit 1, the second detecting circuit 2 and the third detecting circuit 3. In the example shown in FIG. 3, an electrode for applying a rated voltage and a ground electrode are shared between the first detecting circuit 1 and the second detecting circuit 2. Additionally, an electrode for applying a rated voltage and a ground electrode are shared between the second detecting circuit 2 and the third detecting circuit 3. The electronic device 20 is connected to the electrodes 100 through an electric line or a flexible printed circuit board.

In view of the above descriptions, the at least one strain sensor 54, 58 includes a plurality of strain gauges 71, 81, 82, 91 to detect the first information. The first information is a tangential force acting on one of the crank arms 16 or 18. The computer memory device 30 has the plurality of the prestored correction factors associated with the plurality of strain gauges 71, 81, 82, 91. The processor 28 is configured to calculate at least one of the human input force and the human input power by using individual torques detected by the plurality of strain gauges 71, 81, 82, 91. The at least one of the human input force and the human input power is corrected with the plurality of the prestored correction factors.

Figure 9:
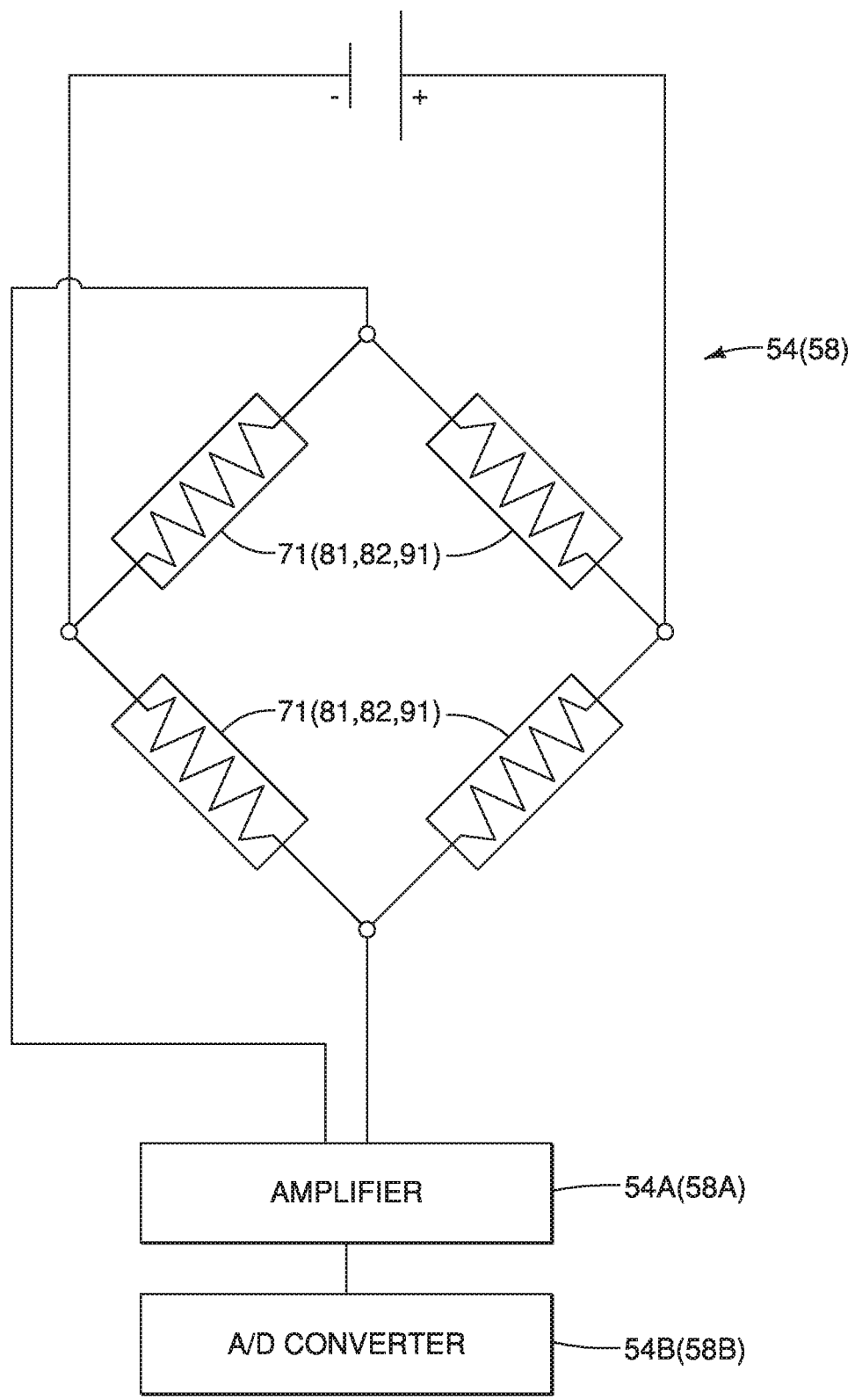
FIG. 9 is a circuit diagram of a Wheatstone bridge circuit and related components that may be used to provide a voltage output proportional to the force applied to the crank arm for one group of four of the strain gauges.
Figure 10:
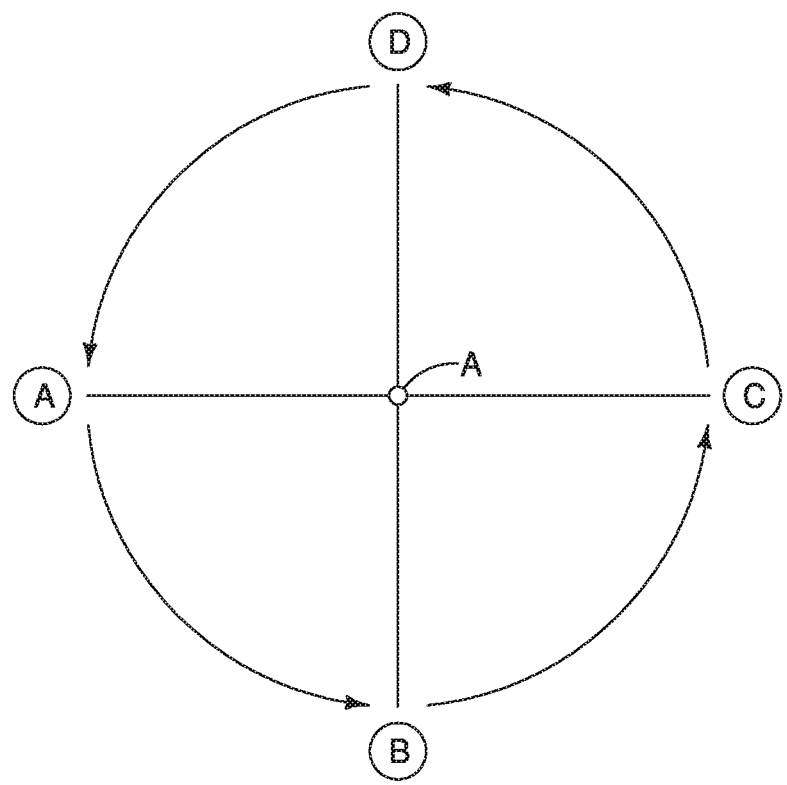
FIGS. 10-11 illustrate an output voltage waveform of the Wheatstone bridge circuit of FIG. 9 for approximately one revolution a crank arm.
Figure 11:
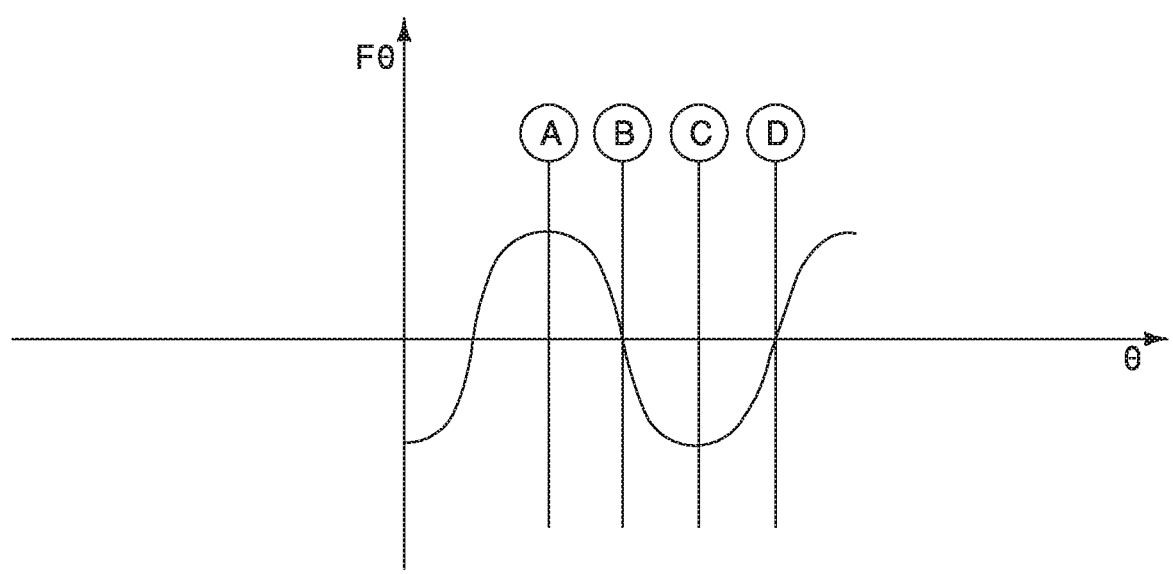

Referring now to FIGS. 9-11, an example of one of the Wheatstone bridge circuit and a representative output as each crank arm rotates 360 degrees about the axis A is illustrated. The strain gauges 71, 81, 82, 91 each include leads connected in a Wheatstone bridge circuit arrangement. For example, as shown in FIG. 9, the strain gauges are connected in the circuit arrangement shown. Other circuit arrangements are possible that use more or less strain gauges, such as a half bridge configuration. An input voltage is applied to the bridge circuit and the output voltage of the circuit is proportional to the tangential bending force (torque) applied to the crank arm. The output voltage may be applied to some form of conditioning and amplification circuitry, such as a differential amplifier and filter that will provide an output voltage. It is further possible to use an analog to digital converter to convert and condition each signal as shown. The measuring device 52 and 56 can include only one or two of the first detecting circuit 1, the second detecting circuit 2 and the third detecting circuit 3.

With the illustrated strain gauge configuration, the output voltage of the Wheatstone bridge circuit is proportional to the torque applied and also indicative of the direction of rotation and the crank position. As illustrated in FIGS. 10-11, generally speaking, the output of the Wheatstone bridge will be a sinusoid with the highest output voltage with the crank approximately horizontal and a downward force applied to the crank arm (crank position A, FIG. 11). As the crank moves through the downward vertical position (crank position B), the voltage will typically be about 0, as the crank moves upward to horizontal (crank position C) the voltage will be slightly negative. Typically the downward force of the opposing crank arm pushes the measured arm up against some weight of the rider's leg (typically riders do not pull upward on the cranks, the opposing leg hence uses some force to push the opposing crank arm upward against the opposing leg), and as the crank moves through the upward vertical position (crank position D) the output voltage will transition from a negative value to a positive value, and reach its peak output again as the crank is rotated through horizontal (crank position A).

It is possible for power measurement to only occur on one of the two crank arms 16 or 18. In other words, the strain sensor 54 or 58 can be provided to only one of the crank arm 16 and the crank arm 18. In such an arrangement, relative symmetry between the right and left leg of a given rider is assumed and the average power calculated from the power measurement device on one crank is doubled and transmitted to the display processor. Regardless, the power calculations/measurements displayed are preferably indicative of the total power output by a given rider. Of course, in the illustrated embodiment, each crank arm of a given machine can provide individual crank arm power measurements. In such an implementation, a rider can be provided with data on each individual leg as well as a total power output indicative of overall power output.

The cadence sensor 31 is included in the power measurement device but can be separate. The magnet M placed on the frame is attached such that a reed switch of the cadence sensor 31 closes as it passes the magnet. Thus, the time between two pulses of the reed switch indicate one complete revolution of the crank. Using a microprocessor clock of the electronic device 20, the pulses can be converted to a revolution per minute measurement.

Figure 12:
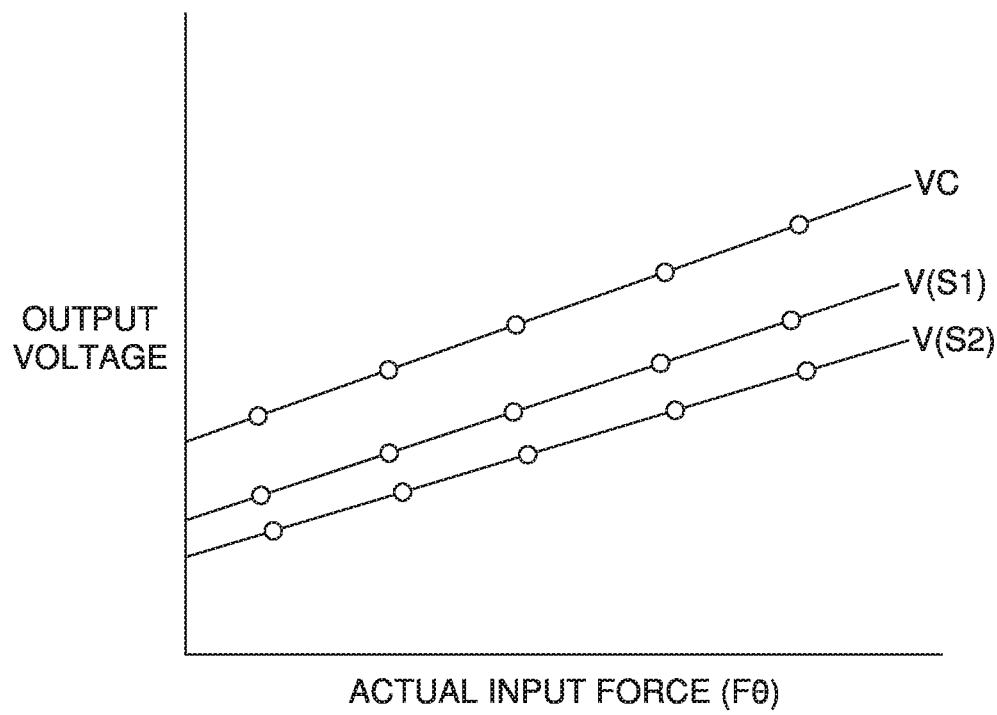
FIG. 12 is graph showing one possible relationship between strain gauge output voltages when the chain is on the different front sprockets and corrected voltages.
Figure 13:
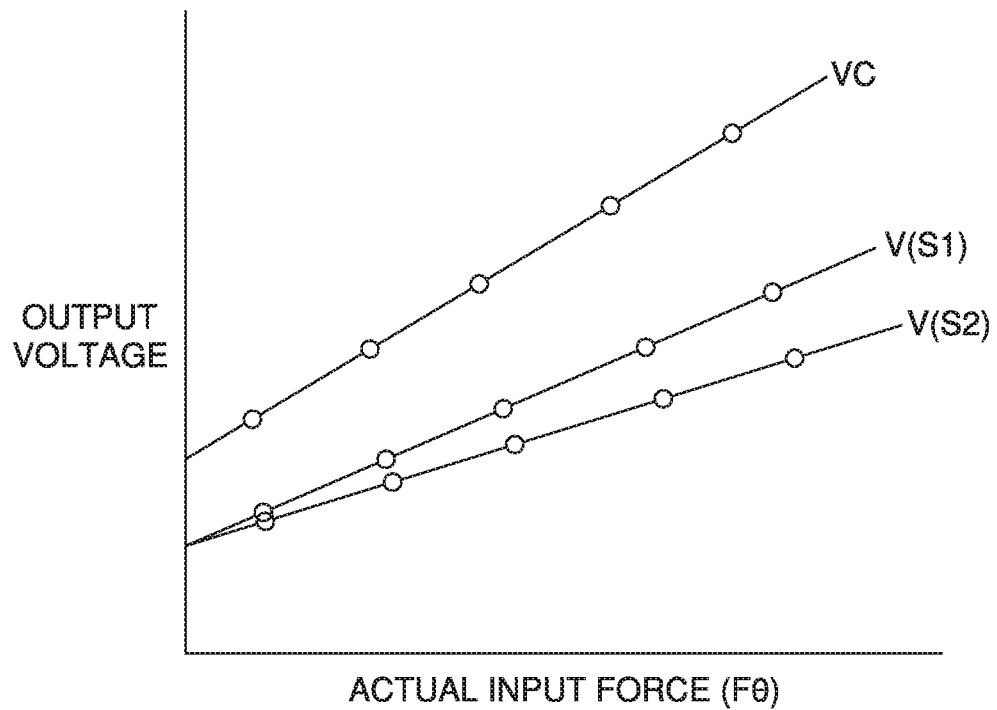
FIG. 13 is a graph showing another possible relationship between strain gauge output voltages when the chain is on the different front sprockets and corrected voltages.
Figure 14:
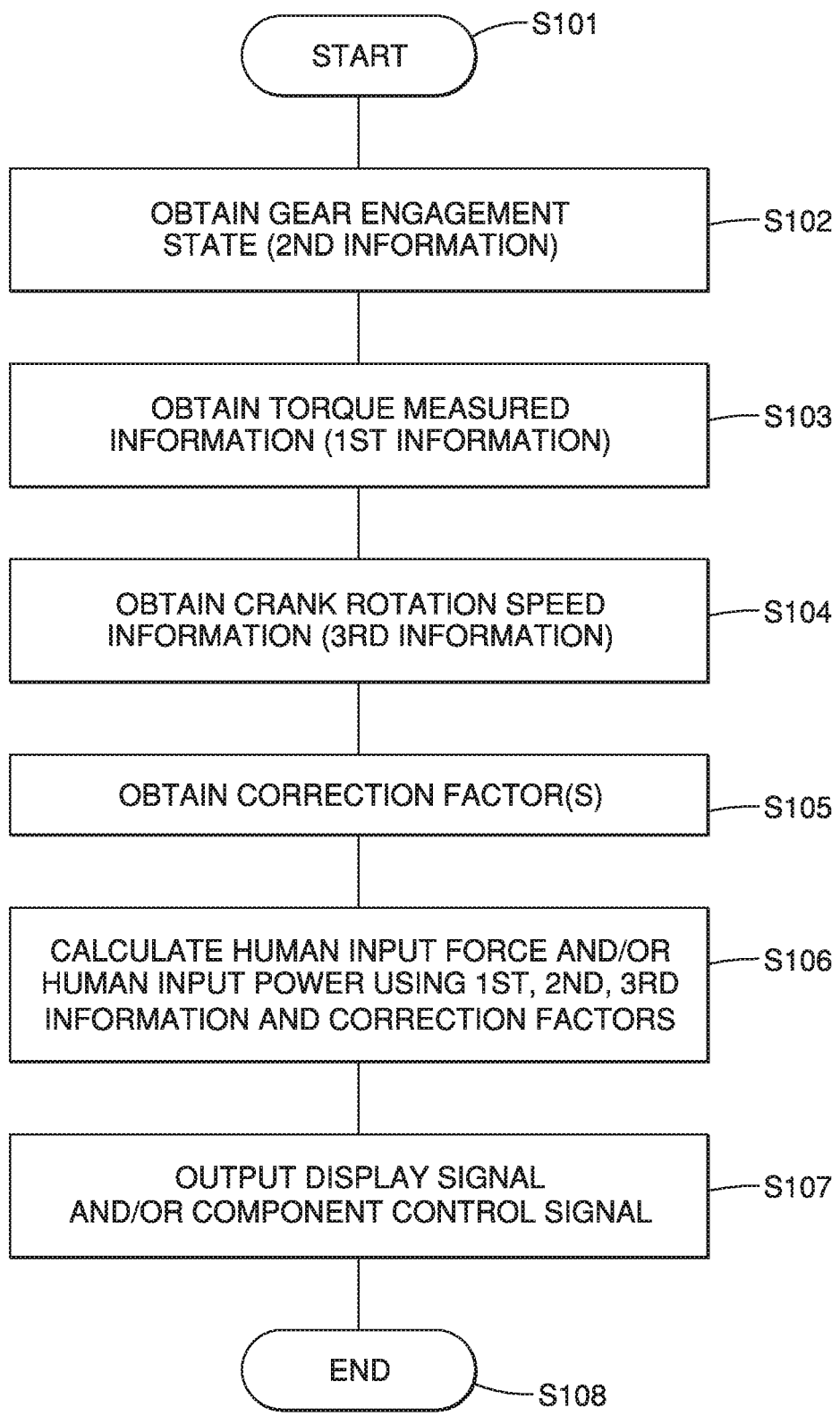
FIG. 14 is a flowchart illustrating how the electronic device operates in order to calculate human input force and/or human input power in accordance with the present invention.

Referring now to FIGS. 12-14, the manner in which human input force and/or human input power are calculated will now be explained in more detail. The electronic device receives first, second and third information, as mentioned above. The first information is the torque measured by the strain gauges 71, 81, 82 and 91. Each bridge circuit outputs a single voltage indicative of the measured force (expressed as a voltage) across the bridge circuit. The second information is which gear sprocket S1 or S2 the chain BC is on. This information is provided by the vehicle sensor VS (two examples provided herein). The third information is crank rotation speed information provided by the cadence sensor 31. The electronic device 20 further uses a correction factor to calculate human input force and/or human input power. This is done because the measured forces do not account for the chain location (gear engagement state).

As shown in FIG. 14, the flow chart illustrating one example of the operation of the electronic device 20 has eight steps S101-S108. S101 is a step starting the operations. Step S102 is a step in which the gear engagement state (second information) is obtained (received) from the vehicle sensor VS. Step S103 is a step in which the torque measured (first information) is obtained (received) from the strain sensor(s) 54, 58. Step S104 is a step in which crank rotation speed information (third information) is obtained (received) from the cadence sensor 31. Step S105 is a step in which, based on the gear engagement state (second information), the torque measured (first information) is compared to the data stored in the memory device 30 (e.g., correction factor data illustrated in FIG. 12 or 13 for example) to obtain a correction factor k. Step S106 is a step in which human input force and/or human input power is/are calculated based on the first, second and third information, as explained below.

In a case, where human input force is desired (e.g., human input power is not desired) the step S104 and the third information obtained therein is not needed. In other words, the third information is needed to calculate human input power but not necessarily human input force. Therefore, calculation is performed using at least the first and second information. In a case where human input power calculation is desired, the calculation is performed using the first, second and third information. The obtaining of the first second and third information shown in steps S101-S104 does not have to be in the order illustrated. In fact, any order or simultaneously obtaining these items of information is possible. Step S107 is a step in which the human input force and/or human input power calculated in the step S106 is incorporated into an output signal. The output signal can be a display signal and/or a control signal. In the case of a display signal, the signal is sent to the cycle computer CC and/or mobile device MD to be displayed on the display 46. In the case of a component control signal the output signal can be sent to the cycle computer CC and/or mobile device MD, which in turn can control a component or components such as a suspension, seat post, or shifting device based on the control signal. Of course, the control signal could be directly sent to a component or components to be controlled based on the signal. Step S108 is the ending step of the process of FIG. 14. At step S108, the process of FIG. 14 is repeated at some time intervals, and human input force and/or human input power is updated with each completion of the process of FIG. 14.

Therefore, the electronic device 20 calculates a human input force (e.g. tangential force) FO or human input power based on information of sensors and the gear state information. The memory device 30 stores information of correction factor relative to the gear state information. Two examples of relationships between the measured voltages V1 and V2 when the chain BC is on the sprockets S1 and S2 with corrected voltage VC are illustrated in FIGS. 12-13. The processor 28 calculates a force or power from the correction factor and information of sensors. As mentioned above, each four strain gauges make a wheat stone bridge circuit. Each wheat stone bridge circuits output voltage, so there are three output voltages on each crank arm 16 and 18. In this case, the relation formula between force and voltage is below.

$$F\theta = k1*V1 + k2*V2 + k3*V3, \text{ where}$$

V1, V2 and V3 are output voltage of each bridge circuit.
V1 is output of the bridge circuit including strain gages 71A, 71B, 71C, 71D in FIG. 8.
V2 is output of the bridge circuit including strain gages 81A, 81B, 82A, 82B in FIG. 8.
V3 is output of the bridge circuit including strain gages 91A, 91B, 91C, 91D in FIG. 8.
k1, k2 and k3 are correction factors. The correction factors can be raw numerical values or a function based on testing (e.g., such as the actual measured values illustrated in FIG. 14). In other words, k1, k2 and k3 are determined by examination/experimentation with a particular transmission 10, and thus, exact values are not provided.

If the number of strain sensors is bigger and bigger, accuracy becomes higher and higher. However, additional strain sensors may result in more complication and cost. In addition, the sensors should preferably be disposed between a pedal axle of the pedal P and a crank shaft 14 if a crank arm is used. There is no limit the numbers or the sensors and posture of the sensors. The strain sensors can be attached on the each side of the crank arm in a rotational direction. It can be confusing when there are a plurality of parameters, so there are four strain gauges which makes a bridge circuit. Thus, output voltage of the bridge circuit is only one. FIGS. 12-13, as mentioned above are two examples of relationship between the actual input force (FO) and output voltage V of each bridge circuit. Each of the sensor circuits 52 and 56 can be a measuring device constructed in accordance with U.S. Patent Publication No. 2017/0176275. The relation formula between force and voltage can be as follows; $F\theta=(k1*V1+k2*V2+k3*V3)/3$, $F\theta=k1*V1$, $F\theta=k2*V2$, or $F\theta=k3*V3$.

The bottom line in the Figures show a relationship between the actual input force (F$\theta$) and Output voltage of one of the bridge circuits when the chain is engaged with inner gear sprocket S2. The middle line in the Figures shows relationship between the actual input force (F$\theta$) and output voltage of one of the bridge circuits when the chain is engaged with outer gear sprocket S1. If actual input forces are the same, the output voltages are different. However, it is possible to calculate the correction factors for correcting the voltages to the correction voltage VC. If the inclinations are parallel to each other, like FIG. 12, the calculation of correction factors is easy. If the inclinations are not parallel to each other, like FIG. 13, the calculation of correction factors is not as easy but still possible.

The human input force FO alone can be calculated, displayed, and/or used to control components such as the shifting devices (e.g., derailleurs, seat post or suspension). Alternatively, or additionally, human input force FO can be used to calculate human input power, which in turn can be displayed, and/or used to control components such as the shifting devices (e.g., derailleurs, seat post or suspension). Human power is calculated by a formula below.

Human power ($W$: watt)=tangential force ($F\theta$)×rotational speed of the crank As used herein a mobile device MD is a portable computing device small enough to hold and operate in the hand. Typically, any handheld computer device will have an LCD or OLED flatscreen interface, providing a touchscreen interface with digital buttons and keyboard and/or physical buttons along with a physical keyboard such as a smartphone or tablet computer.

The cycling computer CC is the same as a cyclocomputer, cycle computer, or cyclometer. The cycling computer CC is a device mounted on a bicycle that calculates and displays trip information, similar to the instruments in the dashboard of a car. The cycling computer CC and/or mobile device MD usually can be attached to the handlebar by an attachment device for easy viewing. The electronic device 20 can be included in third electrical unit 23 or the second electrical unit 22.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the electronic device, the crank assembly and/or the drive train. Accordingly, these directional terms, as utilized to describe the electronic device, the crank assembly and/or the drive train should be interpreted relative to a bicycle in an upright riding position on a horizontal surface and that is equipped with the electronic device, the crank assembly and/or the drive train. The terms "left" and "right" are used to indicate the "right" when referencing from the right side as viewed from the rear of the bicycle, and the "left" when referencing from the left side as viewed from the rear of the bicycle.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electronic device for calculating at least one of a human input force and a human input power that are inputted to a drive train of a human powered vehicle, the electronic device comprising:
   a receiver configured to receive first information with respect to torque applied to the drive train, and to receive at least one of second information with respect to a gear engagement state of a plurality of sprockets with a chain and third information with respect to a crank rotational speed of the drive train;
   a computer memory device having a plurality of prestored correction factors with respect to the gear engagement state; and
   a processor configured to calculate at least one of the human input force and the human input power, the human input force being applied to the drive train based on the first information, the second information and at least one of the prestored correction factors, the human input power being based on the first information, the second information, the third information, and at least one of the prestored correction factors.

2. The electronic device according to claim 1, wherein the computer memory device has the plurality of the prestored correction factors associated with a plurality of strain sensors coupled to the drive train to detect the first information,
   the processor is configured to calculate at least one of the human input force and the human input power by using individual signals detected by the plurality of strain sensors as a part of the first information, and
   the at least one of the human input force and the human input power is corrected with the plurality of the prestored correction factors.

3. The electronic device according to claim 1, further comprising
   a display in communication with the processor, and the processor being configured to output a signal related to at least one of the human input force and the human input power to the display.

4. The electronic device according to claim 1, wherein the electronic device is a remote component that is separated from the drive train.

5. The electronic device according to claim 4, wherein the electronic device is one of a cycling computer or a mobile device.

6. A crank assembly comprising the electronic device according to claim 1, the crank assembly further comprising
   a crank assembly body; and
   at least one strain sensor coupled to the crank assembly body to detect the first information.

7. The crank assembly according to claim 6, wherein the crank assembly body including at least one of a crank arm, a crank shaft, a sprocket carrier, and a plurality of sprockets.

8. The crank assembly according to claim 7, wherein the sprocket carrier and at least one of the plurality of sprockets are formed as a one piece member.

9. The crank assembly according to claim 6, further comprising
   a crank rotational speed sensor coupled to the crank assembly body to detect the third information.

10. The crank assembly according to claim 6, wherein the at least one strain sensor includes a plurality of strain gauges to detect the first information.

11. The crank assembly according to claim 10, wherein the computer memory device has the plurality of the prestored correction factors associated with the plurality of strain gauges, and
    the processor is configured to calculate at least one of the human input force and the human input power by using individual torques detected by the plurality of strain gauges, and
    the at least one of the human input force and the human input power is corrected with the plurality of the prestored correction factors.

12. The crank assembly according to claim 7, wherein the electronic device is provided on one of the crank arm, the crank shaft, the sprocket carrier, and the plurality of sprockets.

13. The crank assembly according to claim 12, wherein the electronic device is provided on the crank arm.

14. The crank assembly according to claim 7, wherein the strain sensor is provided to the crank arm.

15. The crank assembly according to claim 14, further comprising an additional strain sensor provided to an additional crank arm.

16. The crank assembly according to claim 6, further comprising
a wireless transmitter that wirelessly communicates with a wireless receiver of a display, and transmits information of at least one of the human input force and the human input power to the wireless receiver.

17. A drive train comprising the crank assembly according to claim 6, the drive train further comprising
a vehicle sensor arranged to detect a parameter associated with a gear engagement state of the plurality of sprockets with a chain as the second information.

18. The drive train according to claim 17, wherein
the vehicle sensor includes a vehicle transmission position sensor that detects a movement of an electric motor or a movement of a reduction gear of the electric motor of a transmission device as the parameter associated with the gear engagement state.

19. The drive train according to claim 17, wherein
the vehicle sensor includes a vehicle speed sensor that detects a rotational speed of a wheel of the human-powered vehicle as the parameter associated with the gear engagement state.

* * * * *